(12) United States Patent
Ojanperä

(10) Patent No.: US 9,195,740 B2
(45) Date of Patent: Nov. 24, 2015

(54) AUDIO SCENE SELECTION APPARATUS

(75) Inventor: Juha Ojanperä, Nokia (FI)

(73) Assignee: Nokia Technologies Oy, Espoo (FI)

( * ) Notice: Subject to any disclaimer, the term of this patent is extended or adjusted under 35 U.S.C. 154(b) by 217 days.

(21) Appl. No.: 13/979,900

(22) PCT Filed: Jan. 18, 2011

(86) PCT No.: PCT/IB2011/050215
§ 371 (c)(1),
(2), (4) Date: Jul. 16, 2013

(87) PCT Pub. No.: WO2012/098427
PCT Pub. Date: Jul. 26, 2012

(65) Prior Publication Data
US 2013/0297054 A1    Nov. 7, 2013

(51) Int. Cl.
*G06F 17/00* (2006.01)
*G06F 17/30* (2006.01)
*H04N 21/2743* (2011.01)
*H04N 21/233* (2011.01)

(52) U.S. Cl.
CPC .......... *G06F 17/3074* (2013.01); *H04N 21/233* (2013.01); *H04N 21/2743* (2013.01); *H04S 2400/15* (2013.01)

(58) Field of Classification Search
CPC ..... H04R 3/005; H04R 25/407; G06K 9/0057
See application file for complete search history.

(56) References Cited

U.S. PATENT DOCUMENTS

| | | | |
|---|---|---|---|
| 6,593,956 B1* | 7/2003 | Potts et al. | 348/14.09 |
| 2004/0013275 A1* | 1/2004 | Balan et al. | 381/92 |
| 2005/0281410 A1 | 12/2005 | Grosvenor et al. | |
| 2008/0273476 A1 | 11/2008 | Cohen et al. | |
| 2009/0097670 A1* | 4/2009 | Jeong et al. | 381/73.1 |
| 2009/0279715 A1* | 11/2009 | Jeong et al. | 381/92 |
| 2010/0111313 A1 | 5/2010 | Namba et al. | |
| 2010/0183280 A1 | 7/2010 | Beauregard et al. | |
| 2011/0123046 A1* | 5/2011 | Hiroe | 381/98 |
| 2011/0317522 A1* | 12/2011 | Florencio et al. | 367/129 |

FOREIGN PATENT DOCUMENTS

| | | |
|---|---|---|
| WO | 2008018042 | 2/2008 |
| WO | 2009034536 | 3/2009 |
| WO | 2009109217 | 9/2009 |
| WO | 2010052365 | 5/2010 |

OTHER PUBLICATIONS

International Search Report received for corresponding Patent Cooperation Treaty Application No. PCT/IB2011/050215, dated Dec. 2, 2011, 5 pages.

\* cited by examiner

*Primary Examiner* — Andrew C Flanders
(74) *Attorney, Agent, or Firm* — Nokia Technologies Oy

(57) ABSTRACT

An apparatus comprising: an audio analyzer configured to determine for a set of received audio signals at least one dominant audio signal source; and a selector configured to select from the set of audio signals at least one audio signal dependent on the at least one dominant audio signal source.

16 Claims, 15 Drawing Sheets

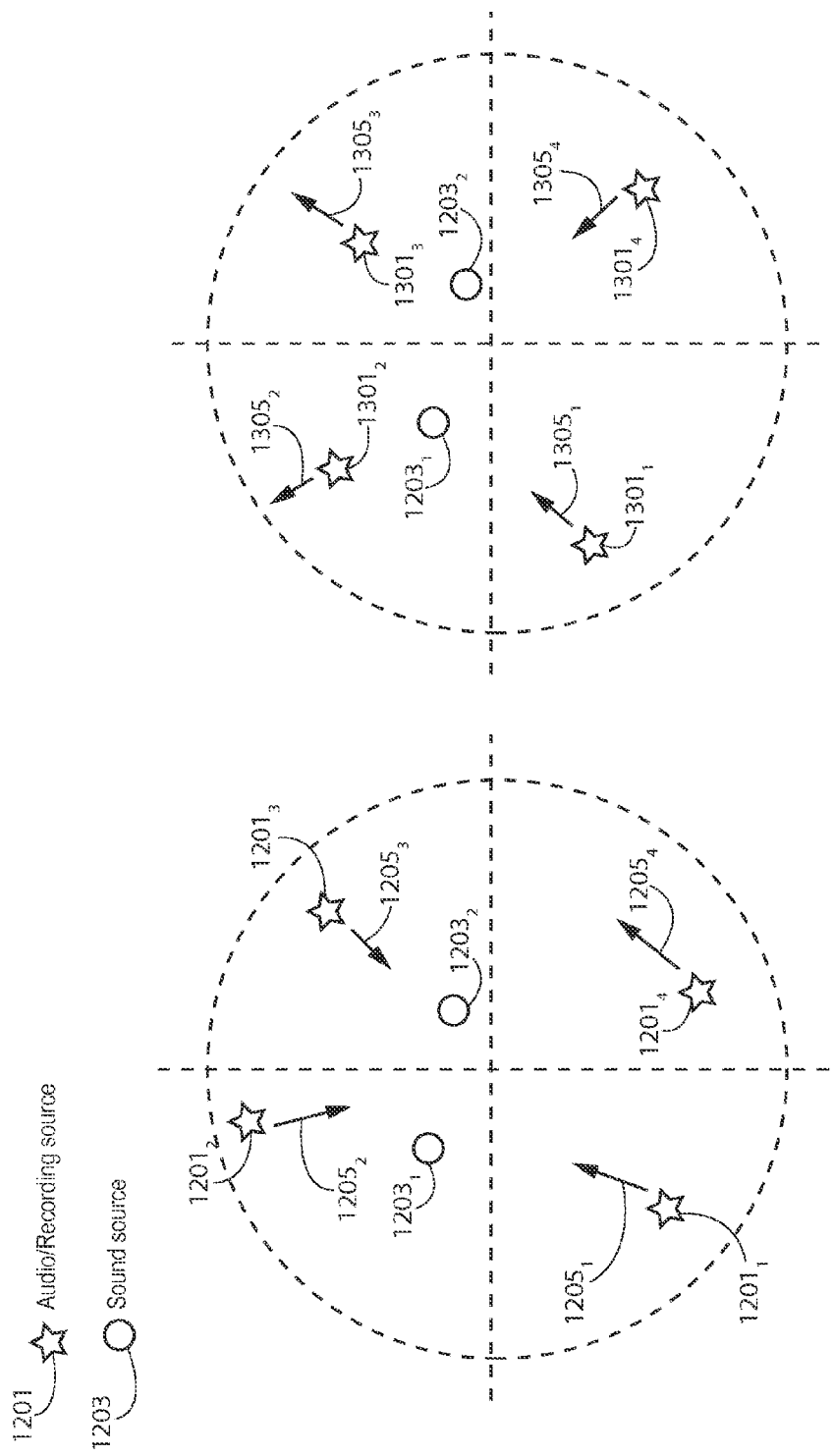

AUDIO SCENE SELECTION APPARATUS

RELATED APPLICATION

This application was originally filed as PCT Application No. PCT/IB2011/050215 filed Jan. 18, 2011.

FIELD OF THE APPLICATION

The present application relates to apparatus for the processing of audio and additionally video signals. The invention further relates to, but is not limited to, apparatus for processing audio and additionally video signals from mobile devices.

BACKGROUND OF THE APPLICATION

Viewing recorded or streamed audio-video or audio content is well known. Commercial broadcasters covering an event often have more than one recording device (video-camera/microphone) and a programme director will select a 'mix' where an output from a recording device or combination of recording devices is selected for transmission.

Multiple 'feeds' may be found in sharing services for video and audio signals (such as those employed by YouTube). Such systems, which are known and are widely used to share user generated content recorded and uploaded or up-streamed to a server and then downloaded or down-streamed to a viewing/listening user. Such systems rely on users recording and uploading or up-streaming a recording of an event using the recording facilities at hand to the user. This may typically be in the form of the camera and microphone arrangement of a mobile device such as a mobile phone.

Often the event is attended and recorded from more than one position by different recording users at the same time. The viewing/listening end user may then select one of the up-streamed or uploaded data to view or listen.

Where there is multiple user generated content for the same event it can be possible to generate an improved content rendering of the event by combining various different recordings from different users or improve upon user generated content from a single source, for example reducing background noise by mixing different users content to attempt to overcome local interference, or uploading errors.

There can be a problem in multiple user generated or recorded systems where the recording devices are in close proximity and the same audio scene is recorded multiple times. This problem can for example be the selection of at least one of the audio signals from one of the audio sources or recording devices from the large number of recordings available within a range of the selected listening point (also known as the audio event). In other words from the view point of an audio server attempting to generate an audio signal for an end user it can be difficult or problematic to select the a relevant part of the audio scene. For example does the audio server select audio signals from audio sources containing the most relevant sound sources and how does the audio server determine which of the uploaded audio sources are the most relevant audio sources. Similarly where the end user is attempting to identify some isolated detail of the audio scene or the general ambience outside of the audio scene how can the audio server determine audio sources containing the 'less common' or 'less relevant' audio signal segments which typically describe the ambience sound of the audio scene. The audio signal routers currently in use typically select only audio sources according to very basic criteria such as "nearest", "loudest" with reference to the audio scene and therefore can miss subtle sound qualities which may be recorded by an audio source at the periphery of the audio scene and requested by the end user.

SUMMARY OF THE APPLICATION

Aspects of this application thus provide an audio source classification process whereby multiple devices can be present and recording audio signals and a server can classify and select from these audio sources suitable signals from the uploaded data.

There is provided according to the application an apparatus comprising at least one processor and at least one memory including computer code, the at least one memory and the computer code configured to with the at least one processor cause the apparatus to at least perform: determining for a set of received audio signals at least one dominant audio signal source; and selecting from the set of audio signals at least one audio signal dependent on the at least one dominant audio signal source.

Determining for a set of received audio signals at least one dominant audio signal source may cause the apparatus to perform: determining for at least one of the set of received audio signals at least one audio event; determining at least one dominant audio event; and determining at least one dominant audio signal source dependent on the dominant audio event determined.

Determining for at least one of the set of received audio signals at least one audio event may cause the apparatus to perform: determining for each of the received audio signals an associated audio signal direction; determining a stable audio signal direction from the associated audio signal direction; and associating at least one audio event with a time interval for the stable audio direction.

Associating at least one audio event with the timings associated with the stable audio signal direction may cause the apparatus to perform determining whether the time interval for the stable audio signal direction intersects with a time interval associated with any determined audio event.

Determining whether the time interval for the stable audio signal direction intersects with a time interval associated with any determined audio event may cause the apparatus to perform generating a further audio event, the further audio event being associated with the time interval for the stable audio signal direction dependent on determining the time interval for the stable audio signal direction is disjoint with every audio event associated time interval.

Determining whether the time interval for the stable audio signal direction intersects with a time interval associated with any determined audio event may cause the apparatus to perform associating an intersection of the time interval associated with a audio event and the time interval for the stable audio signal direction where the time interval associated with the audio event intersects with the time interval for the stable audio signal direction.

Determining a stable audio signal direction may cause the apparatus to perform: determining a first direction value of the associated audio signal direction at a first time; determining a second direction value of the associated audio signal direction at a second time; and determining the difference between the first direction value and the second direction value is less than or equal to a determined difference threshold.

Determining at least one dominant audio event may cause the apparatus to perform: determining at least one dominant audio event associated audio signal direction for a first time being the average of at least one audio event associated audio signal direction; and determining the at least one dominant audio event associated audio signal direction for further times by selecting the audio event with an associated audio signal direction closest to a preceding dominant audio event associated audio signal direction.

Determining at least one dominant audio signal source may cause the apparatus to perform: defining a position of the at least one dominant audio signal source dependent on the dominant audio event determined.

Selecting from the set of audio signals at least one audio signal dependent on the at least one dominant audio signal source may cause the apparatus to perform selecting from the set of audio signals at least one audio signal dependent on an associated direction of the at least one audio signal and the position of the at least one dominant audio signal source.

According to a second aspect of the application there is provided a method comprising: determining for a set of received audio signals at least one dominant audio signal source; and selecting from the set of audio signals at least one audio signal dependent on the at least one dominant audio signal source.

Determining for a set of received audio signals at least one dominant audio signal source may comprise: determining for at least one of the set of received audio signals at least one audio event; determining at least one dominant audio event; and determining at least one dominant audio signal source dependent on the dominant audio event determined.

Determining for at least one of the set of received audio signals at least one audio event may comprise: determining for each of the received audio signals an associated audio signal direction; determining a stable audio signal direction from the associated audio signal direction; and associating at least one audio event with a time interval for the stable audio direction.

Associating at least one audio event with the timings associated with the stable audio signal direction may comprise determining whether the time interval for the stable audio signal direction intersects with a time interval associated with any determined audio event.

Determining whether the time interval for the stable audio signal direction intersects with a time interval associated with any determined audio event may comprise generating a further audio event, the further audio event being associated with the time interval for the stable audio signal direction dependent on determining the time interval for the stable audio signal direction is disjoint with every audio event associated time interval.

Determining whether the time interval for the stable audio signal direction intersects with a time interval associated with any determined audio event may comprise associating an intersection of the time interval associated with an audio event and the time interval for the stable audio signal direction where the time interval associated with the audio event intersects with the time interval for the stable audio signal direction.

Determining a stable audio signal direction may comprise: determining a first direction value of the associated audio signal direction at a first time; determining a second direction value of the associated audio signal direction at a second time; and determining the difference between the first direction value and the second direction value is less than or equal to a determined difference threshold.

Determining at least one dominant audio event may comprise: determining at least one dominant audio event associated audio signal direction for a first time being the average of at least one audio event associated audio signal direction; and determining the at least one dominant audio event associated audio signal direction for further times by selecting the audio event with an associated audio signal direction closest to a preceding dominant audio event associated audio signal direction.

Determining at least one dominant audio signal source may comprise defining a position of the at least one dominant audio signal source dependent on the dominant audio event determined.

Selecting from the set of audio signals at least one audio signal dependent on the at least one dominant audio signal source may comprise selecting from the set of audio signals at least one audio signal dependent on an associated direction of the at least one audio signal and the position of the at least one dominant audio signal source.

According to a third aspect of the application there is provided an apparatus comprising: an audio analyser configured to determine for a set of received audio signals at least one dominant audio signal source; and a selector configured to select from the set of audio signals at least one audio signal dependent on the at least one dominant audio signal source.

The audio analyser may comprise: an audio event determiner configured to determine for at least one of the set of received audio signals at least one audio event; a dominant event determiner configured to determine at least one dominant audio event; and a dominant source determiner configured to determine at least one dominant audio signal source dependent on the dominant audio event determined.

The audio event determiner may comprise: an audio direction determiner configured to determine for each of the received audio signals an associated audio signal direction; a stable signal determiner configured to determine a stable audio signal direction from the audio signal direction; and an event associator configured to associate at least one audio event with a time interval for the stable audio direction.

The event associator may comprise an event overlap determiner configured to determine whether the time interval for the stable audio signal direction intersects with a time interval associated with any determined audio event.

The event associator may further comprise an event generator configured to generate a further audio event, the further audio event being associated with the time interval for the stable audio signal direction dependent on determining the time interval for the stable audio signal direction is disjoint with every audio event associated time interval.

The event associator may further comprise an event editor configured to associate an intersection of the time interval associated with an audio event and the time interval for the stable audio signal direction where the time interval associated with the audio event intersects with the time interval for the stable audio signal direction.

The stable signal determiner may comprise: a first instance determiner configured to determine a first direction value of the associated audio signal direction at a first time; a second instance determiner configured to determine a second direction value of the associated audio signal direction at a second time; and a direction difference determiner configured to determine the difference between the first direction value and the second direction value is less than or equal to a determined difference threshold.

The audio analyser may further comprise: an initial event direction determiner configured to determine at least one dominant audio event associated audio signal direction for a first time being the average of at least one audio event associated audio signal direction; and a succeeding event direction determiner configured to determine the at least one dominant audio event associated audio signal direction for further times by selecting the audio event with an associated audio signal direction closest to a preceding dominant audio event associated audio signal direction.

The audio analyser may comprise a source position estimator configured to define a position of the at least one dominant audio signal source dependent on the dominant audio event determined.

The selector may comprise an audio signal selector configured to select from the set of audio signals at least one audio signal dependent on an associated direction of the at least one audio signal and the position of the at least one dominant audio signal source.

There is provided according to a fourth aspect an apparatus comprising: means for determining for a set of received audio signals at least one dominant audio signal source; and means for selecting from the set of audio signals at least one audio signal dependent on the at least one dominant audio signal source.

The means for determining for a set of received audio signals at least one dominant audio signal source may comprise: means for determining for at least one of the set of received audio signals at least one audio event; means for determining at least one dominant audio event; and means for determining at least one dominant audio signal source dependent on the dominant audio event determined.

The means for determining at least one audio event for at least one of the set of received audio signals may comprise: means for determining for each of the received audio signals an associated audio signal direction; means for determining a stable audio signal direction; and means for associating at least one audio event with a time interval for the stable audio direction.

The means for associating at least one audio event with the timings associated with the stable audio signal direction may comprise means for determining whether the time interval for the stable audio signal direction intersects with a time interval associated with any determined audio event.

The means for determining whether the time interval for the stable audio signal direction intersects with a time interval associated with any determined audio event may comprise means for generating a further audio event, the further audio event being associated with the time interval for the stable audio signal direction dependent on determining the time interval for the stable audio signal direction is disjoint with every audio event associated time interval.

The means for determining whether the time interval for the stable audio signal direction intersects with a time interval associated with any determined audio event may comprise means for associating an intersection of the time interval associated with a audio event and the time interval for the stable audio signal direction where the time interval associated with the audio event intersects with the time interval for the stable audio signal direction.

The means for determining a stable audio signal direction may comprise: means for determining a first direction value of the associated audio signal direction at a first time; means for determining a second direction value of the associated audio signal direction at a second time; and means for determining the difference between the first direction value and the second direction value is less than or equal to a determined difference threshold.

The means for determining at least one dominant audio event may comprise: means for determining at least one dominant audio event associated audio signal direction for a first time being the average of at least one audio event associated audio signal direction; and means for determining the at least one dominant audio event associated audio signal direction for further times by selecting the audio event with an associated audio signal direction closest to a preceding dominant audio event associated audio signal direction.

The means for determining at least one dominant audio signal source may comprise means for defining a position of the at least one dominant audio signal source dependent on the dominant audio event determined.

The means for selecting from the set of audio signals at least one audio signal dependent on the at least one dominant audio signal source may comprise means for selecting from the set of audio signals at least one audio signal dependent on an associated direction of the at least one audio signal and the position of the at least one dominant audio signal source.

According to a fifth aspect of the application there is provided a computer program, comprising: code for determining for a set of received audio signals at least one dominant audio signal source; and code for selecting from the set of audio signals at least one audio signal dependent on the at least one dominant audio signal source, when the computer program is run on a processor.

The code for determining for a set of received audio signals at least one dominant audio signal source may comprise: code for determining for at least one of the set of received audio signals at least one audio event; code for determining at least one dominant audio event; and code for determining at least one dominant audio signal source dependent on the dominant audio event determined.

The code for determining for at least one of the set of received audio signals at least one audio event may comprise: code for determining for each of the received audio signals an associated audio signal direction; code for determining a stable audio signal direction; and code for associating at least one audio event with a time interval for the stable audio direction.

The code for associating at least one audio event with the timings associated with the stable audio signal direction may comprise code for determining whether the time interval for the stable audio signal direction intersects with a time interval associated with any determined audio event.

The code for determining whether the time interval for the stable audio signal direction intersects with a time interval associated with any determined audio event may comprise code for generating a further audio event, the further audio event being associated with the time interval for the stable audio signal direction dependent on determining the time interval for the stable audio signal direction is disjoint with every audio event associated time interval.

The code for determining whether the time interval for the stable audio signal direction intersects with a time interval associated with any determined audio event may comprise code for associating an intersection of the time interval associated with a audio event and the time interval for the stable audio signal direction where the time interval associated with the audio event intersects with the time interval for the stable audio signal direction.

The code for determining a stable audio signal direction may comprise: code for determining a first direction value of the associated audio signal direction at a first time; code for determining a second direction value of the associated audio signal direction at a second time; and code for determining the difference between the first direction value and the second direction value is less than or equal to a determined difference threshold.

The code for determining at least one dominant audio event may comprise: code for determining at least one dominant audio event associated audio signal direction for a first time being the average of at least one audio event associated audio signal direction; and code for determining the at least one dominant audio event associated audio signal direction for further times by selecting the audio event with an associated audio signal direction closest to a preceding dominant audio event associated audio signal direction.

The code for determining at least one dominant audio signal source may comprise code for defining a position of the at least one dominant audio signal source dependent on the dominant audio event determined.

The code for selecting from the set of audio signals at least one audio signal dependent on the at least one dominant audio signal source may comprise code for selecting from the set of audio signals at least one audio signal dependent on an associated direction of the at least one audio signal and the position of the at least one dominant audio signal source.

An electronic device may comprise apparatus as described above.

A chipset may comprise apparatus as described above.

Embodiments of the present invention aim to address the above problems.

SUMMARY OF THE FIGURES

For better understanding of the present application, reference will now be made by way of example to the accompanying drawings in which:

FIGS. 14 to 17 show example audio scene configurations.

EMBODIMENTS OF THE APPLICATION

The following describes in further detail suitable apparatus and possible mechanisms for the provision of effective audio scene selection. In the following examples audio signals and audio capture uploading and downloading is described. However it would be appreciated that in some embodiments the audio signal/audio capture, uploading and downloading is one part of an audio-video system.

Figure 1:
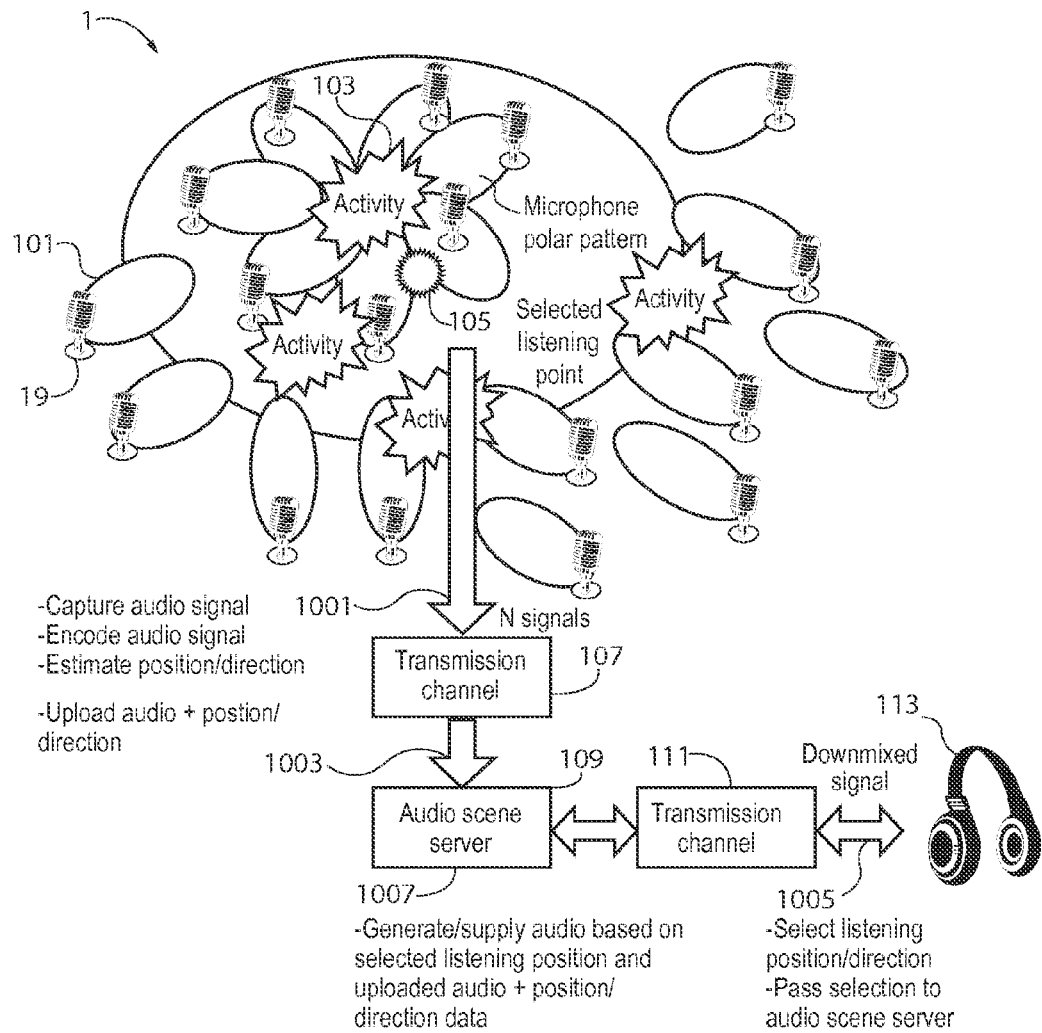
FIG. 1 shows schematically a multi-user free-viewpoint service sharing system which may encompass embodiments of the application.

With respect to FIG. 1 an overview of a suitable system within which embodiments of the application can be located is shown. The audio space 1 can have located within it at least one recording or capturing devices or apparatus 19 which are arbitrarily positioned within the audio space to record suitable audio scenes. The apparatus shown in FIG. 1 are represented as microphones with a polar gain pattern 101 showing the directional audio capture gain associated with each apparatus. The apparatus 19 in FIG. 1 are shown such that some of the apparatus are capable of attempting to capture the audio scene or activity 103 within the audio space. The activity 103 can be any event the user of the apparatus wishes to capture. For example the event could be a music event or audio of a news worthy event. The apparatus 19 although being shown having a directional microphone gain pattern 101 would be appreciated that in some embodiments the microphone or microphone array of the recording apparatus 19 has a omni-directional gain or different gain profile to that shown in FIG. 1.

Each recording apparatus 19 can in some embodiments transmit or alternatively store for later consumption the captured audio signals via a transmission channel 107 to an audio scene server 109. The recording apparatus 19 in some embodiments can encode the audio signal to compress the audio signal in a known way in order to reduce the bandwidth required in "uploading" the audio signal to the audio scene server 109.

The recording apparatus 19 in some embodiments can be configured to estimate and upload via the transmission channel 107 to the audio scene server 109 an estimation of the location and/or the orientation or direction of the apparatus. The position information can be obtained, for example, using GPS coordinates, cell-ID or a-GPS or any other suitable location estimation methods and the orientation/direction can be obtained, for example using a digital compass, accelerometer, or gyroscope information.

In some embodiments the recording apparatus 19 can be configured to capture or record one or more audio signals for example the apparatus in some embodiments have multiple microphones each configured to capture the audio signal from different directions. In such embodiments the recording device or apparatus 19 can record and provide more than one signal from different the direction/orientations and further supply position/direction information for each signal. With respect to the application described herein an audio or sound source can be defined as each of the captured or audio recorded signal. In some embodiments each audio source can be defined as having a position or location which can be an absolute or relative value. For example in some embodiments the audio source can be defined as having a position relative to a desired listening location or position. Furthermore in some embodiments the audio source can be defined as having an orientation, for example where the audio source is a beam-formed processed combination of multiple microphones in the recording apparatus, or a directional microphone. In some embodiments the orientation may have both a directionality and a range, for example defining the 3 dB gain range of a directional microphone.

The capturing and encoding of the audio signal and the estimation of the position/direction of the apparatus is shown in FIG. 1 by step 1001.

The uploading of the audio and position/direction estimate to the audio scene server 109 is shown in FIG. 1 by step 1003.

The audio scene server 109 furthermore can in some embodiments communicate via a further transmission channel 111 to a listening device 113.

In some embodiments the listening device 113, which is represented in FIG. 1 by a set of headphones, can prior to or during downloading via the further transmission channel 111 select a listening point, in other words select a position such as indicated in FIG. 1 by the selected listening point 105. In such embodiments the listening device 113 can communicate via the further transmission channel 111 to the audio scene server 109 the request.

The selection of a listening position by the listening device 113 is shown in FIG. 1 by step 1005.

The audio scene server 109 can as discussed above in some embodiments receive from each of the recording apparatus 19 an approximation or estimation of the location and/or direction of the recording apparatus 19. The audio scene server 109 can in some embodiments from the various captured audio signals from recording apparatus 19 produce a composite audio signal representing the desired listening position and the composite audio signal can be passed via the further transmission channel 111 to the listening device 113.

The generation or supply of a suitable audio signal based on the selected listening position indicator is shown in FIG. 1 by step 1007.

In some embodiments the listening device 113 can request a multiple channel audio signal or a mono-channel audio signal. This request can in some embodiments be received by the audio scene server 109 which can generate the requested multiple channel data.

The audio scene server 109 in some embodiments can receive each uploaded audio signal and can keep track of the positions and the associated direction/orientation associated with each audio source. In some embodiments the audio scene server 109 can provide a high level coordinate system which corresponds to locations where the uploaded/upstreamed content source is available to the listening device 113. The "high level" coordinates can be provided for example as a map to the listening device 113 for selection of the listening position. The listening device (end user or an application used by the end user) can in such embodiments be responsible for determining or selecting the listening position and sending this information to the audio scene server 109. The audio scene server 109 can in some embodiments receive the selection/determination and transmit the downmixed signal corresponding to the specified location to the listening device. In some embodiments the listening device/end user can be configured to select or determine other aspects of the desired audio signal, for example signal quality, number of channels of audio desired, etc. In some embodiments the audio scene server 109 can provide in some embodiments a selected set of downmixed signals which correspond to listening points neighbouring the desired location/direction and the listening device 113 selects the audio signal desired.

Figure 2:
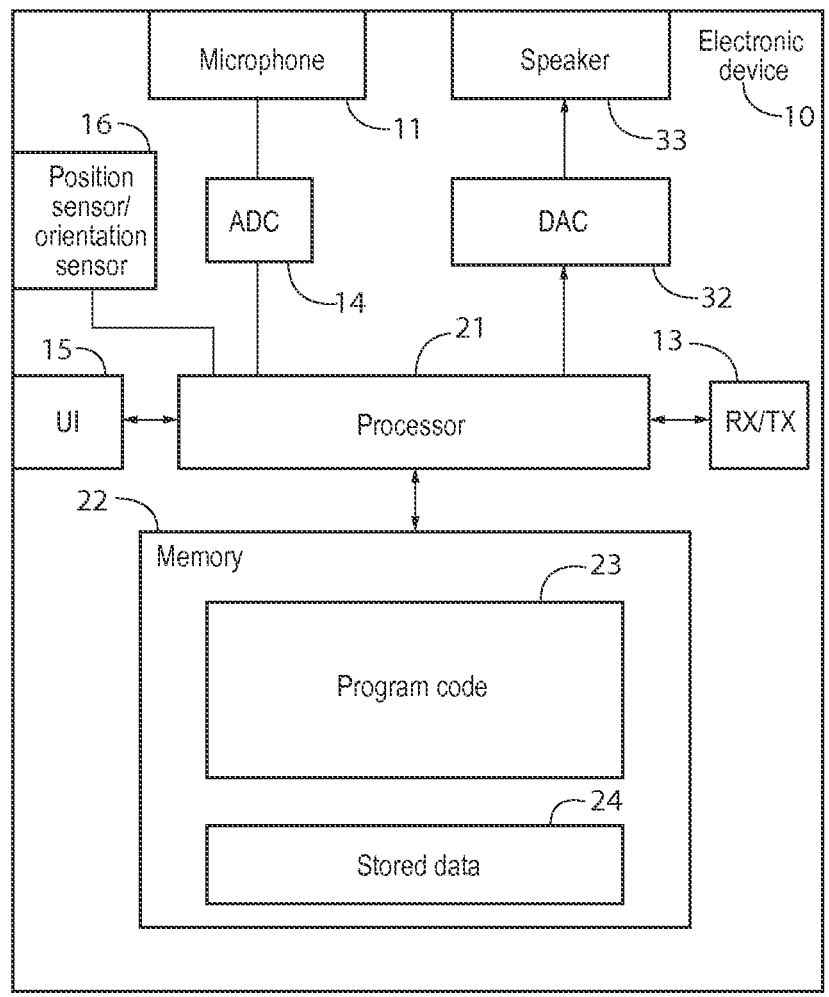
FIG. 2 shows schematically an apparatus suitable for being employed in embodiments of the application.

In this regard reference is first made to FIG. 2 which shows a schematic block diagram of an exemplary apparatus or electronic device 10, which may be used to record (or operate as a recording device 19) or listen (or operate as a listening device 113) to the audio signals (and similarly to record or view the audio-visual images and data). Furthermore in some embodiments the apparatus or electronic device can function as the audio scene server 109.

The electronic device 10 may for example be a mobile terminal or user equipment of a wireless communication system when functioning as the recording device or listening device 113. In some embodiments the apparatus can be an audio player or audio recorder, such as an MP3 player, a media recorder/player (also known as an MP4 player), or any suitable portable device suitable for recording audio or audio/video camcorder/memory audio or video recorder.

The apparatus 10 can in some embodiments comprise an audio subsystem. The audio subsystem for example can comprise in some embodiments a microphone or array of microphones 11 for audio signal capture. In some embodiments the microphone or array of microphones can be a solid state microphone, in other words capable of capturing audio signals and outputting a suitable digital format signal. In some other embodiments the microphone or array of microphones 11 can comprise any suitable microphone or audio capture means, for example a condenser microphone, capacitor microphone, electrostatic microphone, Electret condenser microphone, dynamic microphone, ribbon microphone, carbon microphone, piezoelectric microphone, or microelectrical-mechanical system (MEMS) microphone. The microphone 11 or array of microphones can in some embodiments output the audio captured signal to an analogue-to-digital converter (ADC) 14.

In some embodiments the apparatus can further comprise an analogue-to-digital converter (ADC) 14 configured to receive the analogue captured audio signal from the microphones and outputting the audio captured signal in a suitable digital form. The analogue-to-digital converter 14 can be any suitable analogue-to-digital conversion or processing means.

In some embodiments the apparatus 10 audio subsystem further comprises a digital-to-analogue converter 32 for converting digital audio signals from a processor 21 to a suitable analogue format. The digital-to-analogue converter (DAC) or signal processing means 32 can in some embodiments be any suitable DAC technology.

Furthermore the audio subsystem can comprise in some embodiments a speaker 33. The speaker 33 can in some embodiments receive the output from the digital-to-analogue converter 32 and present the analogue audio signal to the user. In some embodiments the speaker 33 can be representative of a headset, for example a set of headphones, or cordless headphones.

Although the apparatus 10 is shown having both audio capture and audio presentation components, it would be understood that in some embodiments the apparatus 10 can comprise one or the other of the audio capture and audio presentation parts of the audio subsystem such that in some embodiments of the apparatus the microphone (for audio capture) or the speaker (for audio presentation) are present.

In some embodiments the apparatus 10 comprises a processor 21. The processor 21 is coupled to the audio subsystem and specifically in some examples the analogue-to-digital converter 14 for receiving digital signals representing audio signals from the microphone 11, and the digital-to-analogue converter (DAC) 12 configured to output processed digital audio signals. The processor 21 can be configured to execute various program codes. The implemented program codes can comprise for example audio encoding code routines.

In some embodiments the apparatus further comprises a memory 22. In some embodiments the processor is coupled to memory 22. The memory can be any suitable storage means. In some embodiments the memory 22 comprises a program code section 23 for storing program codes implementable upon the processor 21. Furthermore in some embodiments the memory 22 can further comprise a stored data section 24 for storing data, for example data that has been encoded in accordance with the application or data to be encoded via the application embodiments as described later. The implemented program code stored within the program code section 23, and the data stored within the stored data section 24 can be retrieved by the processor 21 whenever needed via the memory-processor coupling.

In some further embodiments the apparatus 10 can comprise a user interface 15. The user interface 15 can be coupled in some embodiments to the processor 21. In some embodiments the processor can control the operation of the user interface and receive inputs from the user interface 15. In some embodiments the user interface 15 can enable a user to input commands to the electronic device or apparatus 10, for example via a keypad, and/or to obtain information from the apparatus 10, for example via a display which is part of the user interface 15. The user interface 15 can in some embodiments comprise a touch screen or touch interface capable of both enabling information to be entered to the apparatus 10 and further displaying information to the user of the apparatus 10.

In some embodiments the apparatus further comprises a transceiver 13, the transceiver in such embodiments can be coupled to the processor and configured to enable a communication with other apparatus or electronic devices, for example via a wireless communications network. The transceiver 13 or any suitable transceiver or transmitter and/or receiver means can in some embodiments be configured to communicate with other electronic devices or apparatus via a wire or wired coupling.

The coupling can, as shown in FIG. 1, be the transmission channel 107 (where the apparatus is functioning as the recording device 19 or audio scene server 109) or further transmission channel 111 (where the device is functioning as the listening device 113 or audio scene server 109). The transceiver 13 can communicate with further devices by any suitable known communications protocol, for example in some embodiments the transceiver 13 or transceiver means can use a suitable universal mobile telecommunications system (UMTS) protocol, a wireless local area network (WLAN) protocol such as for example IEEE 802.X, a suitable short-range radio frequency communication protocol such as Bluetooth, or infrared data communication pathway (IRDA).

In some embodiments the apparatus comprises a position sensor 16 configured to estimate the position of the apparatus 10. The position sensor 16 can in some embodiments be a satellite positioning sensor such as a GPS (Global Positioning System), GLONASS or Galileo receiver.

In some embodiments the positioning sensor can be a cellular ID system or an assisted GPS system.

In some embodiments the apparatus 10 further comprises a direction or orientation sensor. The orientation/direction sensor can in some embodiments be an electronic compass, accelerometer, a gyroscope or be determined by the motion of the apparatus using the positioning estimate.

It is to be understood again that the structure of the electronic device 10 could be supplemented and varied in many ways.

Furthermore it could be understood that the above apparatus 10 in some embodiments can be operated as an audio scene server 109. In some further embodiments the audio scene server 109 can comprise a processor, memory and transceiver combination.

Figure 3:
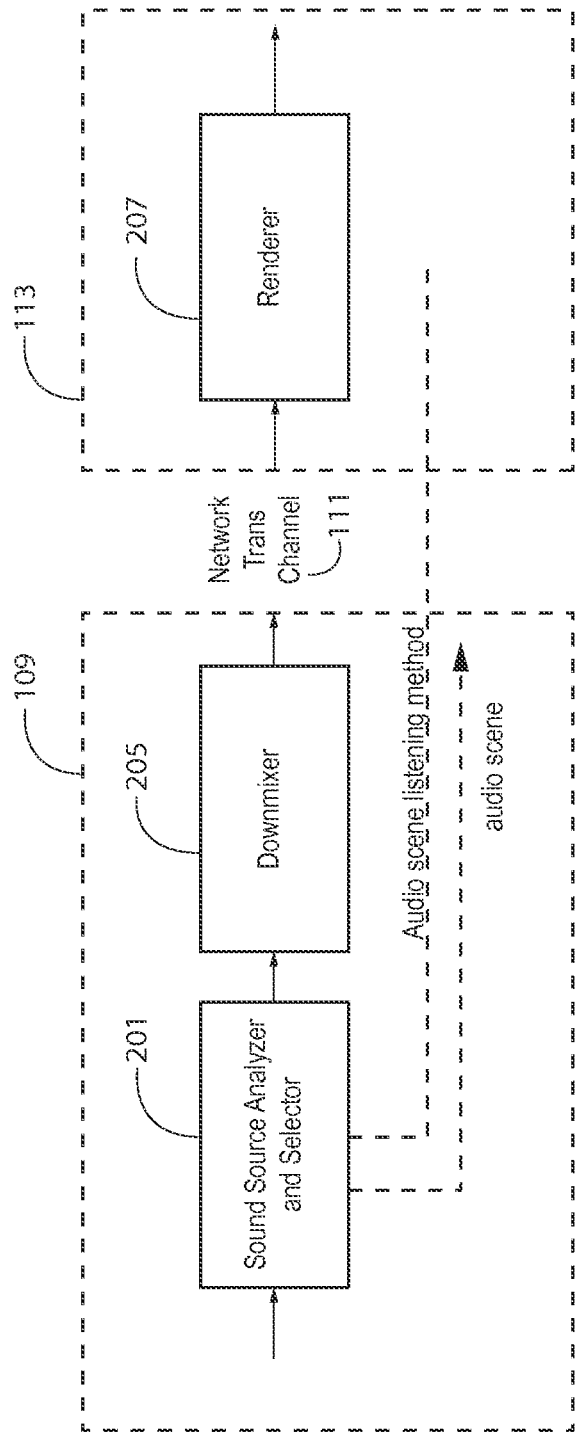
FIG. 3 shows schematically an audio scene system according to some embodiments of the application.

With respect to FIG. 3 an overview of the application according to some embodiments is shown with respect to the audio server 109 and listening device 113. As described herein the audio server 109 is configured to receive the various audio capture sources with their uploaded audio signals. In some embodiments the audio scene server 109 can comprise a sound source analyser and selector 201 for the audio scene. The sound source analyser and selector 201 is configured to, based on receiving from the listening device 113 listening device parameters such as the desired location, orientation of the listening position, and the mode of the listening device (for example parameters determining whether the device is single or multi channel, and the format of the channel separation), analyse and select the audio sources within the determined audio scene. The information received from the listening device 113 can further comprise information such as a radius defining the audio scene surrounding the desired listening location, a desired gain profile or a desired orientation of the audio scene.

The selected audio sources can then be passed to the downmixer. The downmixer 205 in some embodiments is configured to using the selected audio sources generate a signal suitable for transmitting on the transmission channel 111 to the listening device 113 a signal suitable for rendering. For example in some embodiments the downmixer may receive multiple audio source signals and generate a multi-channel or single (mono) channel simulating the effect of being at the desired listening position and in a format suitable for listening to by the listening device. For example where the listening device is a stereo headset the downmixer 205 can be configured to generate a stereo signal.

Furthermore in some embodiments the listening device 113 can comprise a renderer 207. The renderer 207 can be configured to receive the downmixed output signal via the transmission channel 111 and generate a rendered signal suitable for the listening device and user. For example in some embodiments the renderer 207 can be configured to decode the encoded audio signal output by the downmixer 205 in a format suitable for presentation to a stereo headset or headphones or speaker.

Figure 4:
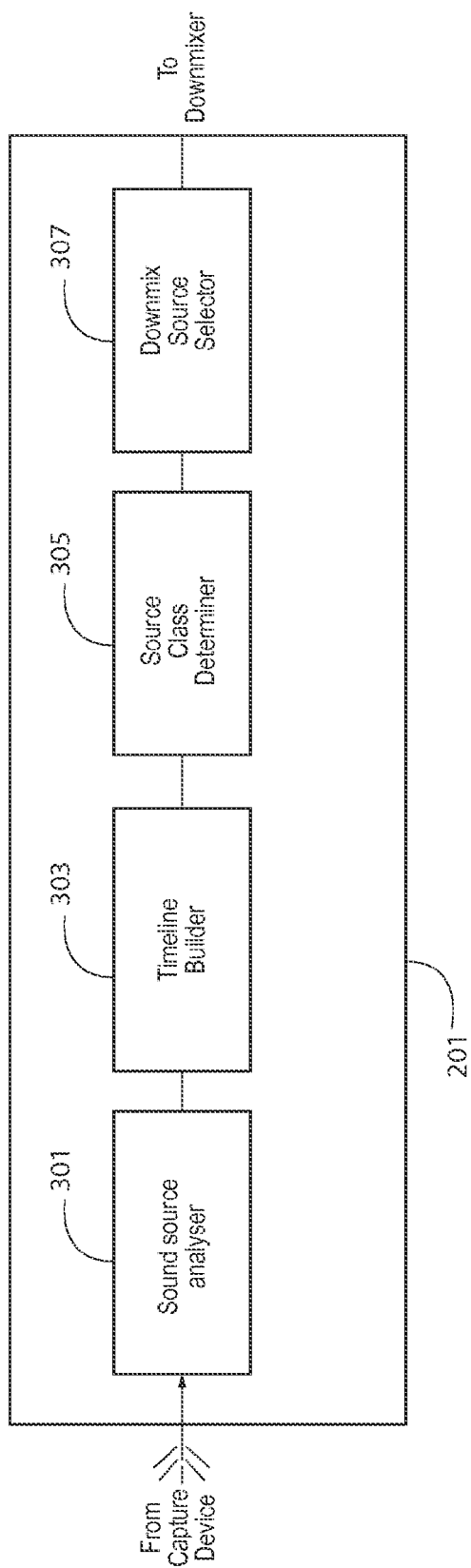
FIG. 4 shows schematically an audio source analyser as shown in FIG. 3 according to some embodiments of the application.

With respects to FIG. 4 an example of the sound source analyser and selector 201 is shown in further detail. Furthermore with respect to FIG. 5 the operation of the sound source analyser and selector 201 according to some embodiments is shown.

The sound source analyser and selector 201 in some embodiments comprises a sound source analyser 301. The sound source analyser 301 is configured to receive the multi-user recorded signals and apply sound source analysis to identify the direction and identify dominant sound sources. In other words therefore the apparatus can comprise means for determining for a set of received audio signals at least one dominant audio signal source. In such embodiments therefore the means for determining at least one dominant audio signal source can comprise means for determining for at least one of the set of received audio signals at least one audio event; means for determining at least one dominant audio event; and means for determining at least one dominant audio signal source dependent on the dominant audio event determined.

Figure 6:
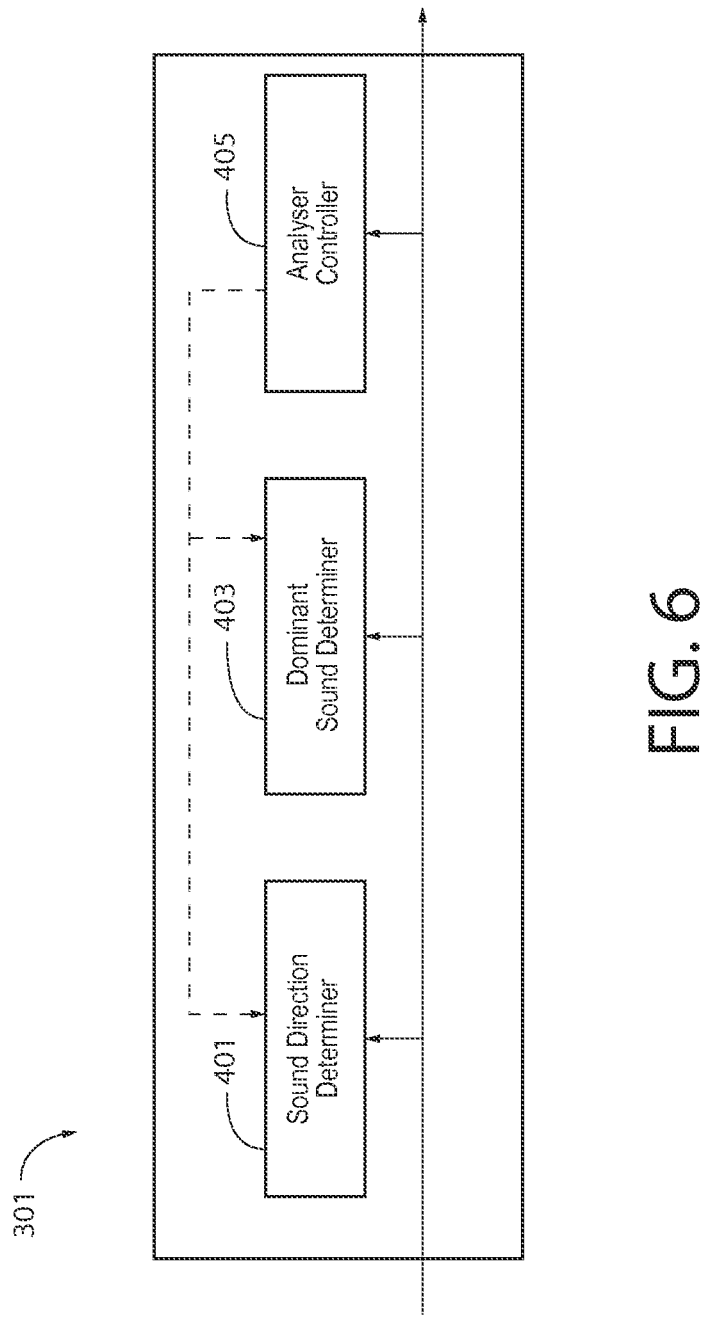
FIG. 6 shows schematically the sound source analyser as shown in FIG. 4 in further detail.

With respect to FIG. 6 an example of the sound source analyser according to some embodiments of the application is shown in further detail. Furthermore with respect to FIG. 7 the operation of the sound source analyser 301 according to some embodiments of the application is shown in further detail.

In some embodiments the sound source analyser 301 comprises an analyser controller 405. The analyser controller 405 can in some embodiments control and/or pre-process audio signals prior to the operations of the sound source analyser 301. For example in some embodiments the analyser controller 405 is configured to receive the various audio signals or audio sources from each of the recording devices, generate frames of the audio signals, and perform a time to frequency domain transformation on each of these frames. In some embodiments the frame can have a length of 20 milliseconds. However any suitable length of frame can be generated or received. In some embodiments each frame can overlap a proceeding or succeeding frame. For example in some embodiments there can be a 10 millisecond overlap between successive frames.

In some embodiments the analyser controller 405 can comprise a time to frequency domain transformer such as a discrete Fourier transformer (DFT), a cosine or sine transformer such as a modified discrete cosine transformer (MDCT) a modified discrete sine transformer (MDST), a quadrature mirror filter (QMF), a complex valued quadrature mirror filter (cv-QMF) or any other suitable time to frequency domain transformer. The output of the transformer can for example be a series of frequency bins or divisions. The analyser controller 405 can furthermore output these frequency domain components to the sound direction determiner 401.

Furthermore in some embodiments the analyser controller 405 can control the sound direction determiner 401 and dominant sound determiner 403 so that all required sound or audio sources are processed.

In some embodiments the sound source analyser 301 comprises a sound direction determiner 401. The sound direction determiner 401 can in some embodiments be configured to receive the frequency domain components of each of the recording source signals or audio sources and determine an initial input signal energy for each of the recording sources (n) over a time window or frame (T) according to the following equation:

$$e_{n,tw,ch} = \sqrt{\sum_{j=0}^{fBins-1} \sum_{t \in T} |\bar{f}_{t,n,ch}(j)|^2},$$

where $\bar{f}_{t,n,ch}$ is the frequency domain representation of $n^{th}$ recording source signal at time instant t for channel ch and fBins is the number of frequency bins available for $\bar{f}_{t,n}$.

In some embodiments the sound direction determiner 401 can determine the initial signal energy on a frame by frame basis for each of the audio sources present in the audio scene. Furthermore in some embodiments successive frames are combined to produce a "tile" or time window (TW) defined by T={t,t+1, . . . t+TS−1} where TS is the size of the time window tile. In some embodiments the size of TS can be 250 milliseconds. In some embodiments the time window T is advanced by a rate of TS/2. In such a way the energy for a current frame is a combination of the current and future frame data. Furthermore by generating an "average" energy over several frames the direction estimation or determination avoids excessive changes as typically perceived sound events do not rapidly change.

The sound direction determiner 401 having determined the input signal energy e can then in some embodiments determine a perceived direction of a source within a time window with the index TW for each recording source according to the following expression:

$$\text{alfa\_r}_{n,tw} = \frac{\sum_{ch=0}^{nCh_n-1} e_{n,tw,ch} \cdot \cos(\phi_{n,ch})}{\sum_{ch=0}^{nCh_n-1} e_{n,tw,ch}},$$

$$\text{alfa\_i}_{n,tw} = \frac{\sum_{ch=0}^{nCh_n-1} e_{n,tw,ch} \cdot \sin(\phi_{n,ch})}{\sum_{ch=0}^{nCh_n-1} e_{n,tw,ch}}$$

where $\phi_{n,ch}$ describes the microphone angle of the $ch^{th}$ channel for the $n^{th}$ recording source relative to the forward axis. Furthermore, $nCh_n$ describes the number of channels available for the $n^{th}$ recording source.

The sound direction determiner 401 can then in further embodiments determine the direction angle of the sound event using the following equation:

$$\theta_{n,tw} = \angle(\text{alfa\_r}_{n,tw}, \text{alfa\_i}_{n,tw})$$

The perceived direction and direction angle can then be repeated for all of the sources and across the number of time windows present for each of the audio sources.

The sound direction determiner, audio direction determiner, 401 can then pass the determined direction angle of the sound event to the dominant sound determiner 403. In other words the apparatus can comprise means for determining for each of the received audio signals an associated audio signal direction.

Figure 7:
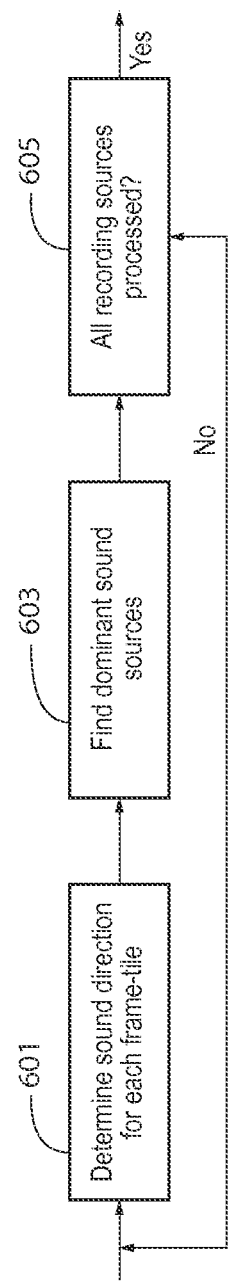
FIG. 7 shows a flow diagram of the operation of the sound source analyser according to some embodiments.

The determination of the sound direction for each frametile is shown in FIG. 7 by step 601.

In some embodiments the sound source analyser 301 comprises a dominant sound determiner 403 configured to receive the determined direction angles of the sound event and determine a dominant sound or audio source.

Figure 8:
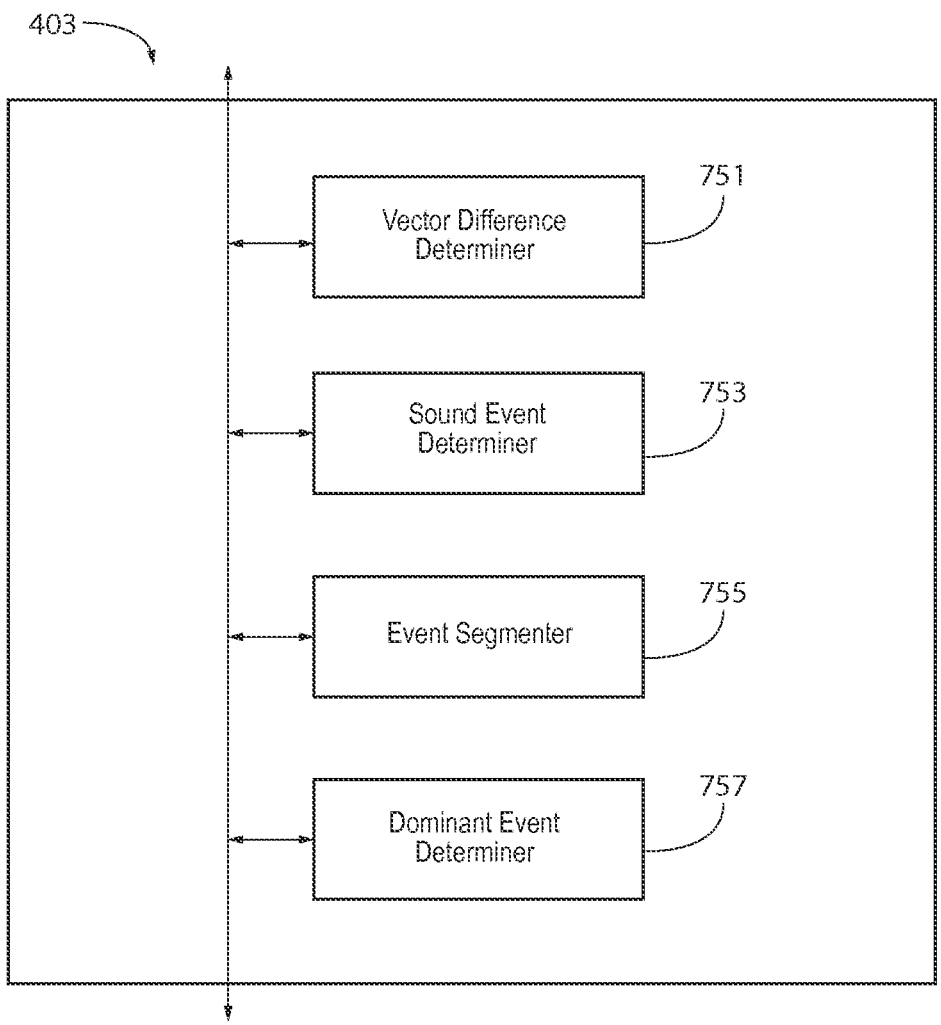
FIG. 8 shows schematically the dominant sound determiner as shown in FIG. 6 in further detail.

With respect to FIG. 8 an example of the dominant sound determiner 403 is shown in further detail. Furthermore with respect to FIG. 9 the operation of the dominant sound determiner is further shown. The dominant sound source can in some embodiments be described as having a start and end time that describes the position of the event within the signal and a direction. In other words dominant sound determiner 403 can be configured in some embodiments to determine which direction the sound event appears to originate as captured by the audio sources.

The dominant sound determiner 403 in some embodiments comprises a vector difference determiner 751.

The vector difference determiner 751 is configured to determine a difference in direction value between successive frames. In some embodiments the vector difference determiner 751 can be configured to operate according to the following pseudo code

```
1    DirVecDifference(input : nDirs, dirVal, output : dirDiffVal)
2    {
3         prevVal = ∑(i=0 to dWidth-1) dirVal[i] / dWidth
4         For i = 0 to nDirs − 1
5         {
6              fVal = 0
7              For m = 0 to dWidth − 1;
8              {
9                   If m + i < nDirs
10                       fVal += dirVal[m + i];
11                  else
12                       Exit for-loop;
13             }
14             dirVal[i] = |fVal/m − prevVal|
15             prevVal = dirVal[i];
16        }
17   }
```

In the example code the value nDirs is the number of inputs ($tEnd_n$), dirVal contains the direction vectors ($\square_n$), and the value of dirDiffVal outputs the direction vector difference. In some embodiments the vector difference determiner 751 is configured to embodiments set number of successive frames over which the determination is carried out (dWidth) to 3. However in other embodiments the window size of the value dWidth can be greater than or less than 3. In other words in some embodiments there can comprise means for determining or a stable signal determiner configured to determine a stable audio signal direction.

Figure 9:
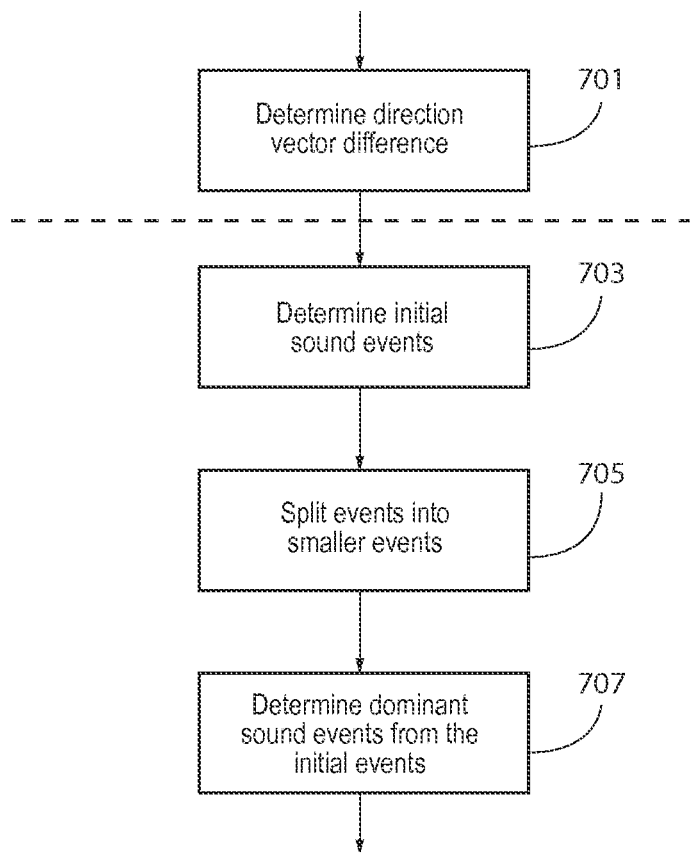
FIG. 9 shows a flow diagram of the operation of the dominant sound determiner as shown in FIG. 6.

The operation of determining the direction vector difference is shown in FIG. 9 by step 701.

The dominant sound determiner 403 can furthermore in some embodiments comprise a sound event determiner 753. The sound event determiner 753 having received the vector difference values can be configured to generate or determine a series of 'events' within the audio signals in other words determining at least one initial scene events and the location or positions within the signal from the audio sources where the events occur or originate. In other words in at least one embodiment the apparatus can comprise means for determining, or an audio event determiner configured to determine, at least one audio event for at least one of the set of received audio signals. In such embodiments there can comprise means for associating at least one audio event with a time interval for the stable audio direction.

In some embodiments therefore there can be employed a first instance determiner configured to determine, or means for determining, a first direction value of the associated audio signal direction at a first time, a second instance determiner configured to determine, or means for determining, a second direction value of the associated audio signal direction at a second time, and a direction difference determiner configured to determine, or means for determining, the difference between the first direction value and the second direction value is less than or equal to a determined difference threshold.

The sound event determiner 753 in some embodiments can be configured to implement the following pseudo code:

```
1   InitialSceneEvents(input : nDirs, dirDiffVal, dirVal,
                       output : dI, events)
2   {
3       Sort dirDiffVal to decreasing order of importance
        (highest value is first, and so on). Set corresponding
        indices to dirDiffVal.sorted.index
4
5       For dI = 0 to nDirs – 1
6         If dirDiffVal.sorted[i] < 10.0f
7           Exit for–loop;
8
9       nSeg = 1;
10      For i = 0 to dI – 2
11      {
12        startIdx = i;
13        endIdx = i;
14        For n = i < dI – 2
15        {
16          if(dirDiffVal.sorted.index[n+1] –
              dirDiffVal.sorted.index[n] < 3)
17          {
18            i++;
19            Continue for –loop;
20          }
21          Else
22          {
23            i++;
24            endIdx = n + 1;
25
26            offset[nSeg++] = endIdx;
27            Exit for–loop;
28          }
29        }
30      }
31
32      offset[nSeg] = dI;
33
34      dI = 1;
35      events[0] = 0;
36      For i = 0 to nSeg – 1
```

-continued

```
37      {
38        nLen = offset[i + 1] – offset[i];
39        events[dI++] = max_idx(dirVal,
                          dirDiffVal.sorted.index[offset[i]],...,
                          dirDiffVal.sorted.index[offset[i] +
                          nLen – 1])
40      }
41  }
``` where the term dI describes the number of initial scene events and the term events describes the positions within the signal, in units of tiles.

The sound event determiner 753 can therefore in some embodiments determine an initial number of boundaries where audio 'events' that the minimum separation difference between successive tiles (which as shown in line 6 of the pseudo code can be a separation of equal to or greater than 10°). Furthermore in some embodiments the sound event determiner 753 can be configured to merge the boundaries between events when determining if the boundaries are too close together. For example lines 10 to 32 of the pseudo code set a threshold distance of 3 tiles wherein any boundaries less than this distance apart are merged. Furthermore the sound event determiner 753 can determine an output or "final" event boundary set by extracting the maximum direction value between the start and end positions defined by sets of determined boundaries (such as described in line 39 of the pseudo code where the value of MAX_idx returns the index and corresponds to the maximum value of the direction vector dirVal between the values dirDiffVal.sorted.index[offset[i]] and dirDiffVal.sorted.index[offset[i]+nLen−1]). The initial sound scene analysis thus locates positions where significant changes in the audio scene occurs. These index values can be further passed to an event segmentor 755.

The operation of determining initial sound events can be seen in FIG. 9 by step 703.

Furthermore the dominant sound determiner 403 can comprise in some embodiments an event segmenter 755. The event segmenter 755 can in such embodiments be configured to further split the events determined by the sound event determiner 753 into smaller event portions. The event segmenter 755 can thus in some embodiments perform the following pseudo code operations in order to split the event into smaller events.

```
1   AudSplitDirEvents(input : dirVal, nDirs, dI, tileLength, events
                      output : nEventsOut
2   {
3     i = 0;
4     new_iterations:
5
6     For i to dI – 1
7     {
8       if (i == 0)
9         startIdx = 0; endIdx = events[i + 1];
10      else if(i == dI – 1)
11        startIdx = events[i]; endIdx = nDirs;
12      Else
13        startIdx = events[i]; endIdx = events[i + 1];
14
15             $$mean = \sum_{j=startIdx}^{endIdx-1} dirVal[j] / (endIdx - startIdx)$$
```

```
16        var = $\sum_{j=startIdx}^{endIdx-1}$ |mean – dirVal[j]| / (endIdx – startIdx)

17
18        if(var > 5.0f)
19        {
20           AudSplitEvent(endIdx – startIdx, dirVal + startIdx, tileLength,
                dirEvent, nDirEventsOut)
21
22           if(nDirEventsOut > 1)
23           {
24              for(j = 0; j <= i; j++)
25                 eventsNew[j] = events[j];
26
27              for(j = 1; j < nDirEventsOut; j++)
28                 eventsNew[i + 1 + (j – 1)] = startIdx + dirEvent[j].startIdx;
29
30              for(j = i + 1; j < dI; j++)
31                 eventsNew[j + nDirEventsOut – 1] = events[j];
32
33              dI += nDirEventsOut – 1;
34              i += nDirEventsOut;
35              events = eventsNew;
36              goto new_iterations;
37           }
38        }
39     }
40  }
```

In the event segmenter 755 example shown in the pseudo code the value of tileLength of the size of TS can be determined in milliseconds. For each event segment the event segmenter 755 can be configured to determine the mean and variance of the direction value. Furthermore the event segmenter 755 can be configured to split the event into parts where the variance exceeds the threshold value. In some embodiments the threshold can be set to an angular separation of 5° (as shown in the example pseudo code on line 18) and can split these events into smaller event segments (as shown in the pseudo code on line 20).

Furthermore the event segmenter 755 in such embodiments is able to further perform further event segmentation of segmented event parts (such as described on line 22). The event segmenter 755 can in such embodiments replace the current segment or event with the values of the new events can and the remaining segments can be appended to the newly determined segments (such as described on lines 24 to 35 of the above pseudo code). The event segmenter 755 can then restart the operation using the new event segmentation (such as described on line 36 of the pseudo code).

The event segmenter 755 can perform the splitting operation (as shown in line 20 of the segmentation pseudo code) for example using the following splitting pseudo code:

```
1   AudSplitEvent(input : nDir, dirVal, tileLength
       output : dirEvent, nEventsOut)
2   {
3      DirVecDifference(nDirs, dirVal, dirDiffVal)
4
5      For i = 0 to nDirs – 5
6         dirDiffValThr[i] = $\sum_{n=0}^{3}$ dirDiffVal[n + i]
7
8      InitialSceneEvents(nDirs, dirDiffValThr, dirVal, nEvents, dI)
9
10     AudGetDirEvents(dirDiffValThr, nDirs, dI, tileLength, nEvents,
          dirEvent, nEventsOut)
11  }
```

The event segmenter 755 can in such embodiments calculate the direction difference (shown by line 3 of the splitting pseudo code) which can be further enhanced by summing or combining successive tiles which can reveal in some embodiments where there are changes occurring (and changes other than any short term changes that do not have practical meaning). The event segmenter 755 can then determine in some embodiments the initial boundaries within the segment such as described on line 8 of the splitting pseudo code. Furthermore the event segmentor 755 can determine the final boundaries for the events by using the sound scene analysis operation such as shown in line 10 of the above pseudo code.

The segmented events can then be passed to the dominant event determiner 757.

The operation of segmenting or splitting some of the initially determined events into smaller event parts is shown in FIG. 9 by step 705.

In some embodiments the dominant sound determiner 403 comprises a dominant event determiner 757 which is configured to receive the event information from the sound event determiner 753 and the event segmenter 755 to determine at least one dominant event. In other words the dominant sound determiner 403 can comprise means for determining at least one dominant audio event.

The dominant event determiner 757 in some embodiments is configured to determine a dominant sound source location from the determined sound scenes according to the following pseudo code:

```
1   AudGetDirEvents(input : dirVal, nDirs, dI, tileLength, events,
       output : dirEvent, nDirEventsOut
2   {
3      nDirEvents = 0;
4
5      For i = 0 to dI – 1
6      {
7         If i == 0
8            startIdx = 0; endIdx = events[i + 1];
9         else if i == dI – 1
10           startIdx = events[i]; endIdx = nDirs;
11        else
12           startIdx = events[i]; endIdx = events[i + 1];
13
14        mean = $\sum_{j=startIdx}^{endIdx-1}$ dirVal[j] / (endIdx – startIdx)
15
16        var = $\sum_{j=startIdx}^{endIdx-1}$ |mean – dirVal[j]| / (endIdx – startIdx)
17
18        dirEvent[nDirEvents].dirVec = mean;
19        dirEvent[nDirEvents].startIdx = startIdx;
20        dirEvent[nDirEvents++].endIdx = endIdx;
21     }
22
23     dir_merge_start:
24
25     for(i = 0; i < nDirEvents; i++)
26     {
```

```
27      eventLength = (dirEvent[i].endIdx − dirEvent[i].startIdx) *
          tileLength;
28
29      if(eventLength < 2000)
30      {
31        if(i == 0)
32        {
33          dirEvent[0].dirVec = dirEvent[1].dirVec;
34          dirEvent[0].endIdx = dirEvent[1].endIdx;
35
36          for(j = 1; j < nDirEvents − 1; j++)
37          {
38            dirEvent[j].dirVec/startIdx/endIdx =
                dirEvent[j + 1].dirVec/startIdx/endIdx;
39          }
40          nDirEvents−−;
41
42          goto dir_merge_start;
43        }
44        else if(i == nDirEvents − 1)
45        {
46          dirEvent[i − 1].endIdx = dirEvent[i].endIdx;
47          nDirEvents−−;
48
49          goto dir_merge_start;
50        }
51        else
52        {
53          dPrev = dirEvent[i − 1].dirVec;
54          dThis = dirEvent[i].dirVec;
55          dNext = dirEvent[i + 1].dirVec;
56
57          if(dPrev < dThis && dNext < dThis)
58          {
59            if(fabs(dPrev − dNext) < 5.0f)
60            {
61              dirEvent[i − 1].dirVec = (dPrev + dNext) * 0.5f;
62              dirEvent[i − 1].endIdx = dirEvent[i].endIdx;
63
64              for(j = i; j < nDirEvents − 1; j++)
65              {
66                dirEvent[j].dirVec/startIdx/endIdx =
                    dirEvent[j + 1].dirVec/startIdx/endIdx;
67              }
68              nDirEvents−−;
69
70              goto dir_merge_start;
71            }
72          }
73          else if(dPrev > dThis && dNext > dThis)
74          {
75            if(fabs(dPrev − dNext) < 5.0f)
76            {
77              dirEvent[i − 1].dirVec = (dPrev + dNext) * 0.5f;
78              dirEvent[i − 1].endIdx = dirEvent[i].endIdx;
79
80              for(j = i; j < nDirEvents − 1; j++)
81              {
82                dirEvent[j].dirVec/startIdx/endIdx =
                    dirEvent[j + 1].dirVec/startIdx/endIdx;
83              }
84              nDirEvents−−;
85
86              goto dir_merge_start;
87            }
88          }
89        }
90      }
91    }
92
93    dir_merge_start2:
94
95    for(i = 0; i < nDirEvents − 1; i++)
96    {
97      dPrev = dirEvent[i − 1].dirVec;
98      dThis = dirEvent[i].dirVec;
99      dNext = dirEvent[i + 1].dirVec;
100
101     if(fabs(dThis − dNext) <= 5.0f)
102     {
103       dirEvent[i].dirVec = (dNext + dThis) * 0.5f;
104       dirEvent[i].endIdx = dirEvent[i + 1].endIdx;
105
106       for(j = i + 1; j < nDirEvents − 1; j++)
107       {
108         dirEvent[j].dirVec = dirEvent[j + 1].dirVec;
109         dirEvent[j].startIdx = dirEvent[j + 1].startIdx;
110         dirEvent[j].endIdx = dirEvent[j + 1].endIdx;
111       }
112       nDirEvents−−;
113
114       goto dir_merge_start2;
115     }
116   }
117   nDirEventsOut = nDirEvents
118 }
```

The dominant event determiner 757 can determine a Direction for each event as the mean of the direction values that exist for the event segment. The dominant event determiner 757 determines the Direction for each event in the dominant event pseudo code in lines 5 to 20. Furthermore in some embodiments the dominant event determiner 757 can be configured to merge events with short durations as described in the dominant event pseudo code on lines 23 to 91 provided that the direction value between these events is within a predetermined limit such as defined by the conditions in lines 57, 59 and in lines 73 and 75. The dominant event determiner 757 can furthermore after each merging restart the determination. The dominant event determiner 757 can be configured in some embodiments, and as shown in the dominant event pseudo code on lines 93 to 118 merge any successive events with close direction values. In some embodiments such as shown in the dominant event pseudo code the merging of successive events can be carried out when current and succeeding events have a directional difference of less than or equal to 5° are merged. Furthermore after each merging the calculations are restarted to validate or check that the list of determined events are valid.

In other words there can be employed an initial event direction determiner configured to determine, or means for determining, at least one dominant audio event associated audio signal direction for a first time being the average of at least one audio event associated audio signal direction. Furthermore there can be employed as described herein a succeeding event direction determiner configured to determine, or means for determining, the at least one dominant audio event associated audio signal direction for further times by selecting the audio event with an associated audio signal direction closest to a preceding dominant audio event associated audio signal direction.

The dominant event determiner 757, having generated suitable event information can in some embodiments determine the dominant event. For example in some embodiments the dominant events can be determined according to the dominance determination pseudo code shown:

```
1   AudFinalEvents(input : nDirEventsOut, dirEvent, tileLength,
                   output : sDir_n, sDir_n.nSoundSources
2   {
3     pos = 0
4     sDir_n.nSoundSources=nDirEventsOut
5     For i = 0 to nDirEventsOut − 1
6     {
7       eventLength = (dirEvent[i].endIdx −
                       dirEvent[i].startIdx) * tileLength;
```

-continued

```
8
9        sDir[n][i].dir = dirEvent [i].dirVec;
10       sDir[n][i].startTime = pos;
12       sDir[n][i].stopTime = pos + eventLength;
13
14       pos += eventLength;
15    }
16  }
```

The operation of determining a dominant sound event from the initial determined events is shown in FIG. 9 by step 707.

Furthermore the finding of the dominant event for an audio source is shown in FIG. 7 by step 603.

Furthermore in some embodiments the analyser controller 405 can after the dominant sound determiner 403 is configured to determine a dominant sound determine whether or not all of the audio sources have been processed. Where the analyser controller 405 determines that all of the recording sources have been processed the operation passes to time line building by the time line builder 303 as discussed herein however where there are remaining recording process sources to be processed the operation passes back to the determination of the sound direction for each frame tile for a further audio source. The operation of checking whether all audio sources have been processed is shown in FIG. 7 by step 605.

Figure 5:
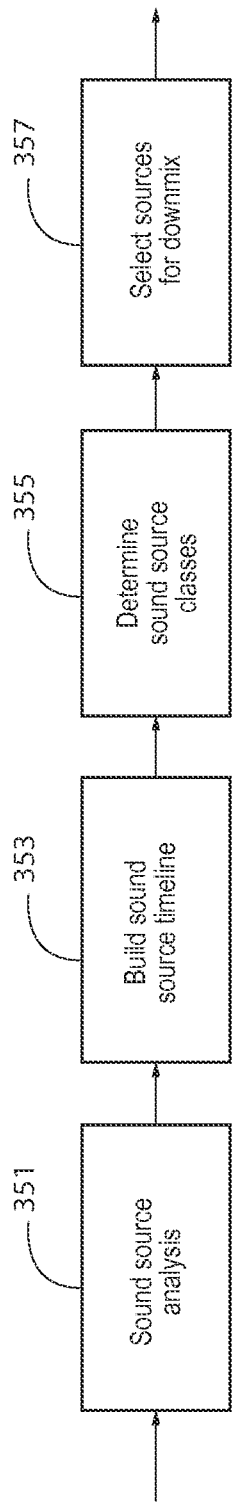
FIG. 5 shows a flow diagram of the operation of the audio source analyser according to some embodiments.

The analysis of the sound source is shown in FIG. 5 by step 351.

In some embodiments the sound source analyser and selector 201 comprises a time line builder 303. The time line builder 303 is configured to receive the identified and determined dominant sound source segments for each of the audio sources and generate a time line for each of the dominant sounds.

Figure 10:
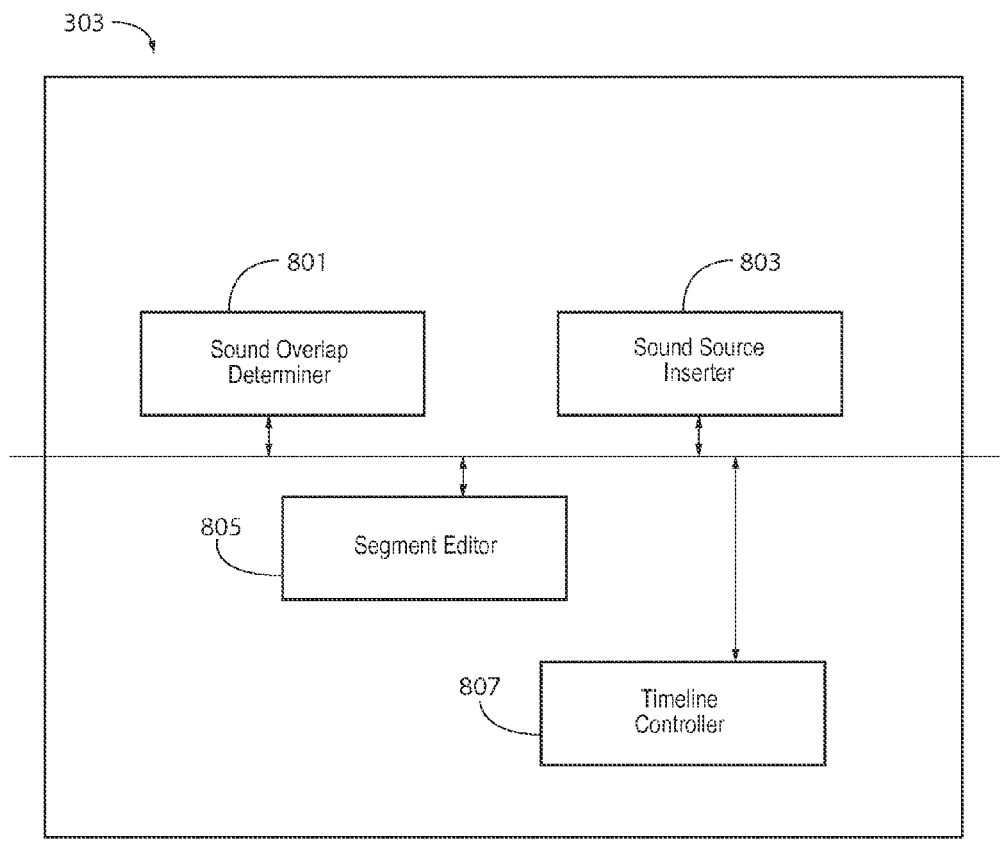
FIG. 10 shows schematically the timeline builder as shown in FIG. 4 in further detail.

With respect to FIG. 10 an example time line builder 303 is shown in further detail according to some embodiments. Furthermore with respect to FIG. 11 the operations according to some embodiments of the time line builder 303 is shown.

The time line builder 303 in some embodiments comprises a sound overlap determiner 801. The sound overlap determiner 801 can be configured to receive the dominant sound source information from each audio source and locate overlapping sound source segments between audio sources. The sound overlap determiner 801 can thus provide an indication whether or not a sound source segment overlaps and dependent on the overlapping nature of the sound source pass this information either to a segment editor 805 or to a sound source inserter 803. In such embodiments the event associator comprises an event overlap determiner configured to determine, or means for determining whether the time interval for the stable audio signal direction intersects with a time interval associated with any determined audio event.

Figure 11:
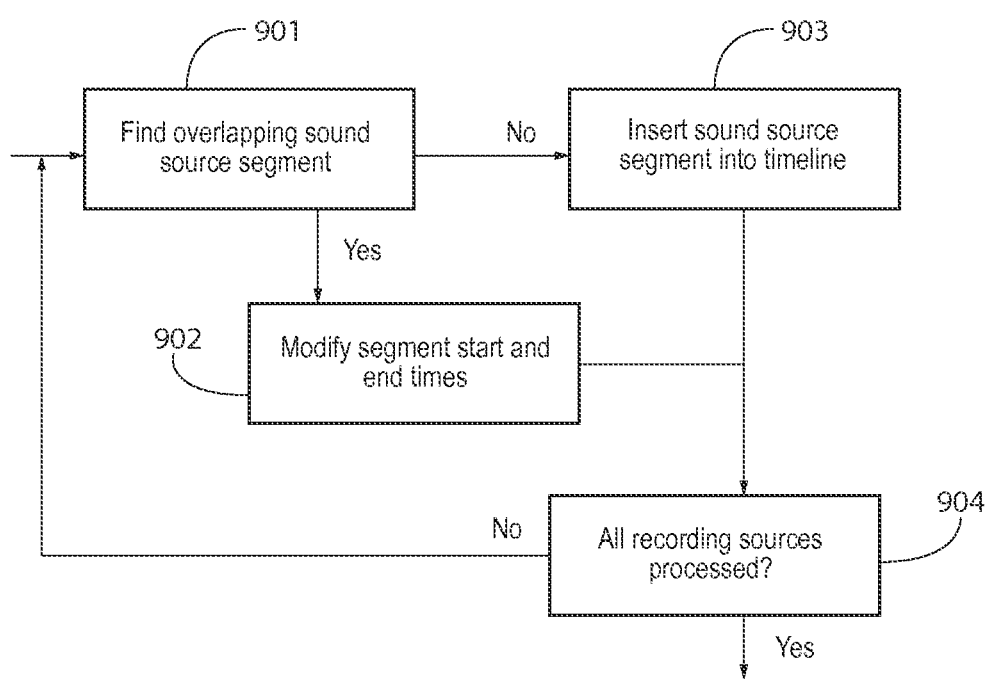
FIG. 11 shows a flow diagram of the operation of the timeline builder according to some embodiments.

The operation of finding or checking for overlapping sound source segments is shown in FIG. 11 by step 901.

Where the sound overlap determiner 801 determines an overlap the time line controller 807 can be configured to initialise the operation of the segment editor 805. Where the sound overlap determiner 801 does not determine an overlapping sound source segment the time line controller 807 can be configured to initialise the sound source inserter 803.

In some embodiments the time line builder 303 comprises a sound source inserter 803. The sound source inserter 803 can in these embodiments when the analysed sound source has been identified as being unique perform an insertion of the sound source segment into the time line. In other words there can be employed an event generator configured to generate, or means for generating, a further or new audio event, the further audio event being associated with the time interval for the stable audio signal direction dependent on determining the time interval for the stable audio signal direction is disjoint with every audio event associated time interval.

The operation of inserting the sound source segment into the time line is shown in FIG. 11 by step 903.

The sound source inserter 803 can then furthermore send an indicator to the time line controller 807 that this sound source segment has been inserted and thus the time line controller 807 carry out a check whether or not all of the recording sources have been processed.

In some embodiments the time line builder 303 comprises a segment editor 805. The segment editor 805 is configured to, when the analysed sound source segment has been identified as overlapping another sound source segment, modify the previously inserted segment start and end times to include the overlapping segment details. The operation of modifying the segment start and end times for overlapping segments is shown in FIG. 11 in step 902. Furthermore the segment editor 805 can be configured to pass an indicator to the time line controller 807 that the segment start and end times have been modified and to perform a check whether all audio sources sound sources have been processed. In such embodiments there can be employed an event editor configured to associate, or means for associating, an intersection of the time interval associated with a audio event and the time interval for the stable audio signal direction where the time interval associated with the audio event intersects with the time interval for the stable audio signal direction The time line controller 807 can then determine whether or not all audio source sound sources have been processed. Where all recording sources have been processed the operation of time line building is completed and information on the time lines passed to the source class determiner 305. However where there are recording sources still to be processed the time line controller can be configured to output or route the next sound source to the sound overlap determiner 801, segment editor 805, and sound source inserter 803. The time line controller 807 can therefore be considered to comprise means for determining, or a dominant source determiner configured to determine, at least one dominant audio signal source dependent on the dominant audio event determined.

The operation of the time line builder 303 can be shown from the following pseudo code:

```
1   Create null vector tDir
2   For s = 0 to sDir_n.nSoundSources-1
3     For i = 0 to tDir_n.nSoundSources-1
4
5       If sDir_{n,s}.startTime≥ tDir_i.startTime and sDir_{n,s}.startTime≤
          tDir_i.stopTime
6         Return i
7       If sDir_{n,s}.stopTime≥ tDir_i.startTime and sDir_{n,s}.stopTime≤
          tDir_i.stopTime
8         Return i
9       If tDir_i.startTime≥ sDir_{n,s}.startTime and tDir_i.stopTime≤
          sDir_{n,s}.stopTime
10        Return i
11    Endfor
12
13    If i returned
14      tDir_i.startTime = min( tDir_i.startTime , sDir_{n,s}.startTime )
15      tDir_i.stopTime = max( tDir_i.stopTime , sDir_{n,s}.stopTime )
16      tDir_i.nRecSources = tDir_i.nRecSources + 1
17    Else
18      i = tDir_n.nSoundSources
19      tDir_i.startTime = sDir_{n,s}.startTime
20      tDir_i.stopTime = sDir_{n,s}.stopTime
21      tDir_i.nSoundSources = 1
22      tDir_i.nRecSources = 1
``` where the values of min( ) and max( ) return the minimum and maximum of the specified values. Line 5 of the time line builder pseudo code shows the start instant overlapping check (in other words whether the start time of the current recording segment is within any other time line segment, line 7 of the time line builder pseudo code checks whether or not the stop time of the recording segment is within any previously defined time line segment, and line 9 checks whether already defined time line segment is within the source recording segment. The updating of the boundaries of the existing segment in the time line is shown in the time line builder pseudo code in lines 14 to 15. The number of recording contributions for the time line segment is updated in line 16 and the sound source segment defined by the value sDir_n,f on the time line by the time line builder pseudo code lines 19 to 23. In other words in at least one embodiment the apparatus comprises means for determining, or a dominant event determiner, configured to determine at least one dominant audio event.

Figure 12:
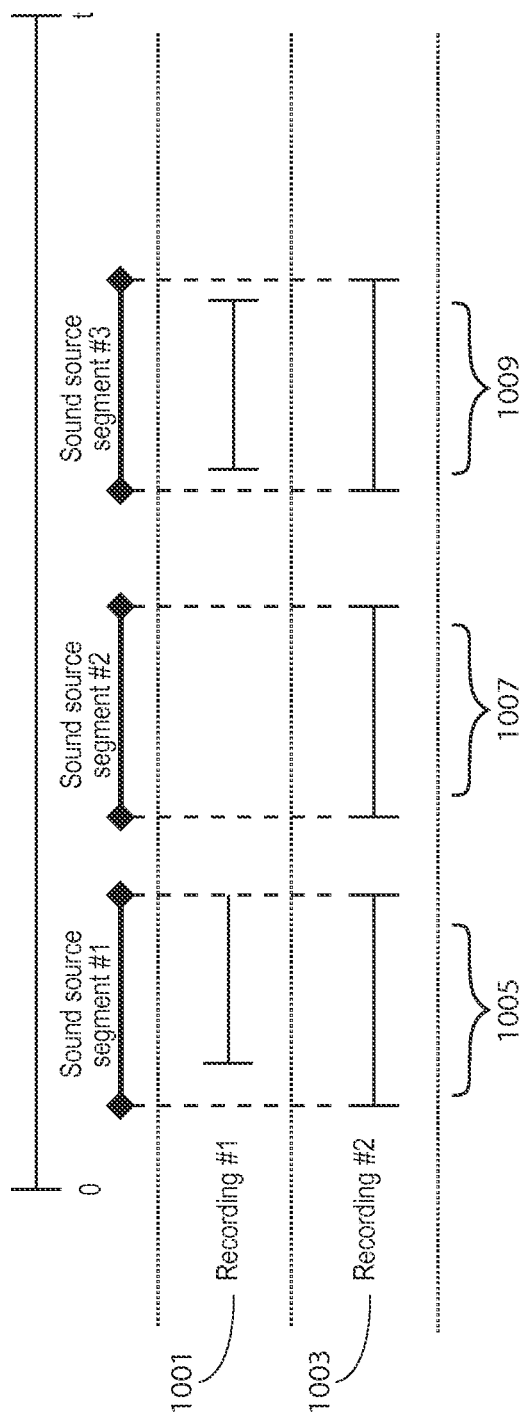
FIG. 12 shows a series of example timelines from sound sources.

With respect to FIG. 12 an example time line can be seen wherein the first audio or recording source #1 1001 is shown to have two dominant sound source segments which fall under the first sound source segment period 1005 and the third sound source segment period 1009 whereas the second audio or recording source #2 1003 has three dominant sound source segments occurring during the first 1005, second 1007 and third 1009 sound source segment periods. The first sound source segment 1005 overlap between recording sources #1 and #2 are such that the time line builder would store a start time of the earliest of the two and an end time of the later of the two as they appear as one sound source. The second sound source in the time line is directly determined from the second recording source 1003 as shown in the time line segment 1007 as there are no overlapping segments found within the time line. The third sound source segment 1009 also overlap between recording sources #1 and #2 are such that the time line builder would store a start time of the earliest of the two and an end time of the later of the two as they appear as one sound source.

In some embodiments the sound source analyser and selector 201 comprises a source class determiner 305. The source class determiner 305 is configured to classify the various sound sources as to whether or not they are in focus or out of focus. In other words, whether or not the recording source is focusing on the dominant sound sources or to a sound source other than the dominant sound source outside of the region of interest.

The sound source determiner 305 in some embodiments can be configured to generate the classification according to the following focus determination pseudo code:

```
 1  numOutliers = 0
 2  For s = 0 to sDir_n.nSoundSources – 1
 3
 4    Find index t from tDir that is within the start and stop time of sDir_n,s
 5    nRecSources = tDir_t.nRecSources
 6
 7    If sDir_n,s.direction belongs to "corner directions"
 8        numOutliers = numOutliers + 1;
 9    If nRecSources equal to 1
10        numOutliers = numOutliers + 1;
11
12  Endfor
```

```
13
14  If numOutliers ≥ sDir_n.nSoundSources
15      ssClass_n = OUT_OF_FOCUS
16  else
17      ssClass_n = IN_FOCUS
``` where in line 7 of the focus determination pseudo code a decision is made whether or not the sound direction of the current segment is at the "centre orientation" with respect to the recording source.

Figure 13:
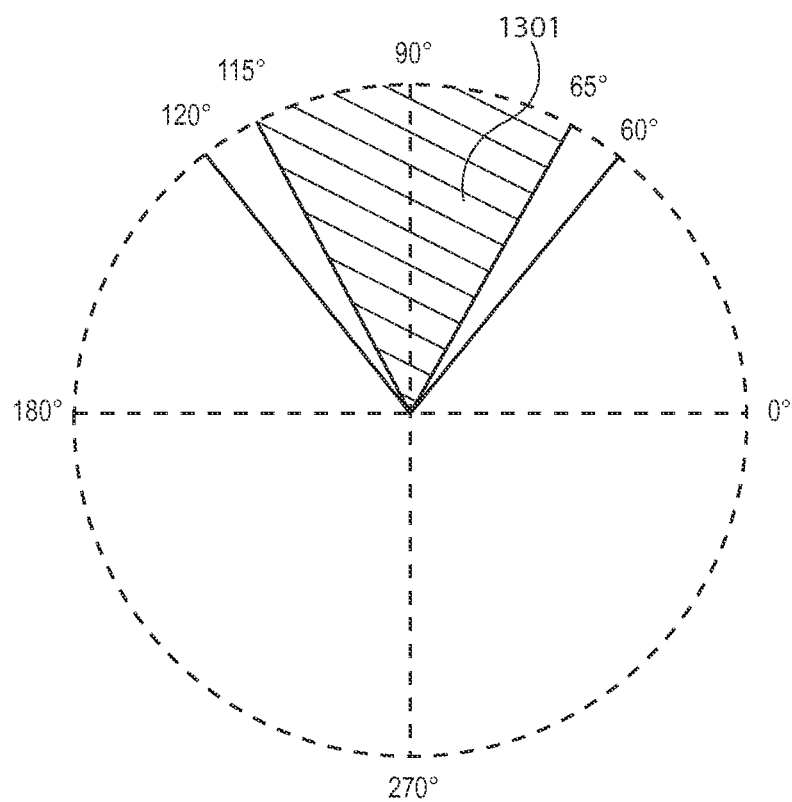
FIG. 13 shows an example of sound orientation against the region of interest.
Figure 17:
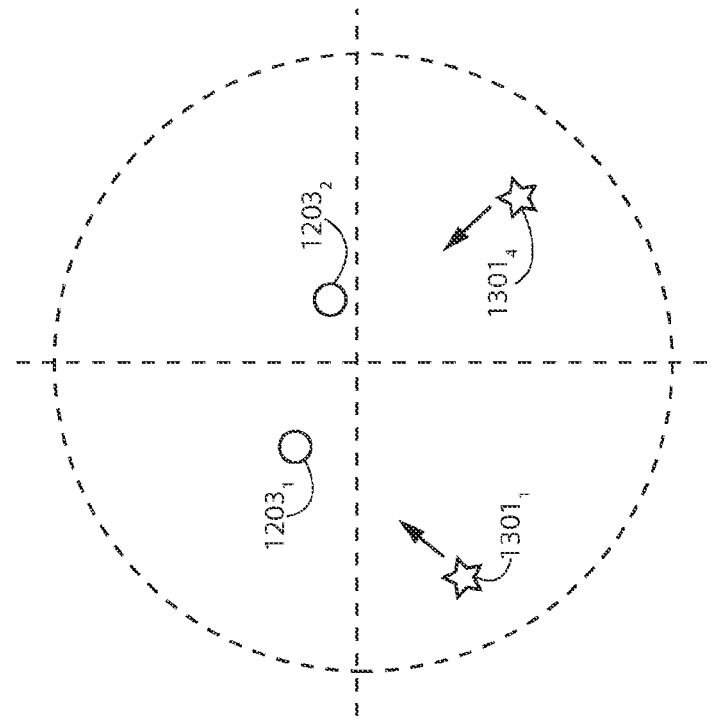
Figure 16:
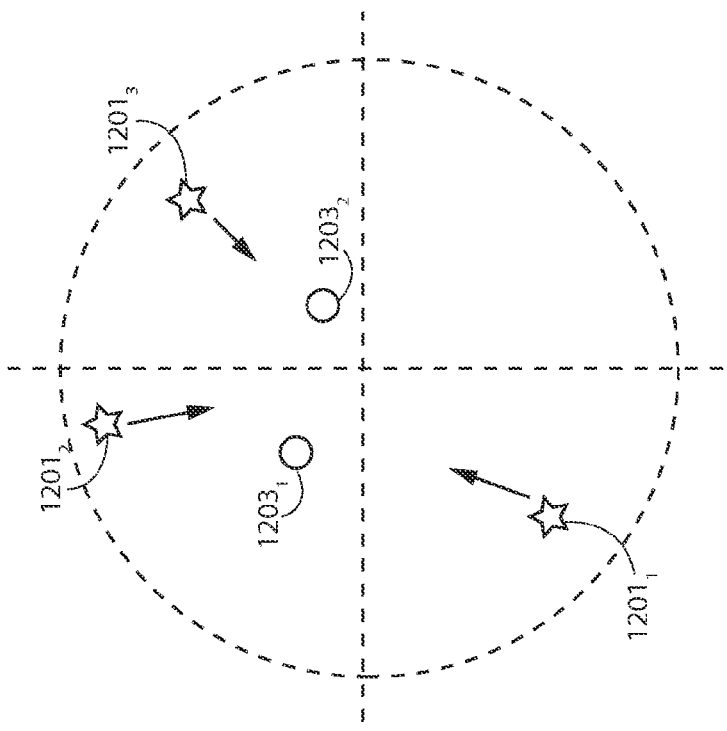

FIG. 13 is an example of this concept. In FIG. 13 the corner directions, the threshold directions determining whether a centre orientation with respect to the recording source, are defined by the direction of the sound source being above 65 degrees or below 115 degrees the direction status variable as defined below refers to the corner directions such as shown in line 7 of the focus determination pseudo code. In other words where the sound source lies inside the segment, where the direction is above 65 degrees and below 115 degrees it is centre orientated or in centre orientation (where the centre direction is 90 degrees). Similarly where the sound source lies outside the segment (the sound direction is below 65 or above 115 it is considered to be outside the centre orientation as shown by the following expression:

$$\text{direction\_status} = \begin{cases} \text{TRUE}, & \text{if } sDir_{n,s} \cdot dir < 65° \text{ or} \\ & \text{if } sDir_{n,s} \cdot dir > 115° \\ \text{FALSE}, & \text{otherwise} \end{cases}$$

In other words, whether or not the sound source lies within the marked segment 1301. In the focus determination pseudo code line 9 a check is made whether other recording sources share the same sound source. In lines 8 and 10 of the focus determination pseudo code the count is updated which indicating out of main focus sources are found for the recording sources whereas in lines 14 to 17 of the focus determination pseudo code the recording source is assigned to one of the determined classes. Thus in some embodiments there can comprise a dominant source determiner configured to determine, or means for determining, at least one dominant audio signal source dependent on the dominant audio event determined In the example shown above there are two classes defined "out of focus" and "in focus" which can be used to indicate which of the audio sources are recording or capturing the dominant sound sources in the audio scene. However it would be appreciated that in some embodiments more classes could be defined according to the degree of focus of the audio source.

Furthermore it is possible in some embodiments that the class assignment is performed on a time wise basis where the duration of a time hop for the determination is for example 20 seconds. In such embodiments the class for each recording source would change as a function of the time.

The determination of the sound source classes is shown in FIG. 5 by step 355.

Furthermore in certain embodiments the sound source analyser and selector comprises a downmix source selector or selector 307. The downmix source selector is configured to receive the audio source data and the associated classifications and from these determine a suitable number of sources to downmix. Thus in some embodiments only sources which are in focus are selected. Therefore the apparatus can in some embodiments comprise means for selecting from the set of audio signals at least one audio signal dependent on the at least one dominant audio signal source.

The selection of sources for downmixing is shown in FIG. 5 by step 357.

With respect to FIGS. 14 to 17 examples of the application of embodiments is shown. In the first example shown in FIG. 14 there comprises an audio scene within which a pair of sound sources 1203 are determined (These are shown as a first sound source $1203_1$ and a second sound source $1203_2$). These are monitored or recorded by four recording or audio sources $1201_1$, $1201_2$, $1201_3$ and $1201_4$. The audio scene shown is defined by a circle of radius r from the desired listening point defined at the centre of the circle with all the recording sources estimated within the boundaries of the circle. In some embodiments such as shown in these examples the circle definition is used purely for illustration and any suitable shape or definition of the audio scene can be used. For example the audio scene can in some embodiments be defined as being rectangular or hexagonal.

As shown in FIG. 14 three of the four audio or recording sources #1 $1201_1$, #2 $1201_2$, and #3 $1201_3$ appear from their associated direction of recording or gain indicators $1205_1$, $1205_2$, $1205_3$ respectively to record or capture the sound sources whereas audio or recording source #4 $1201_4$ is determined to have a recoding directionality $1205_4$, pointing away from the sound sources. In some embodiments where the in-focus audio sources are to be selected in order to provide a 'good' downmix quality signal. This is shown in embodiments with respect to FIG. 16 where the analysed and selected audio sources are the audio or recording sources #1 $1201_1$, #2 $1201_2$, and #3 $1201_3$.

Furthermore with respect to FIG. 15 a further example of an audio scene is shown whereby the first and second audio sound sources 1203 are monitored by four recording sources or recording devices $1301_1$, $1301_2$, $1301_3$ and $1301_4$. In this second example the first $1301_1$ and the fourth $1301_4$ audio source or device appear to be best recording the sound sources according to the directional indicators $1305_1$ and $1305_4$ whereas the second $1301_2$ and third $1301_3$ audio sources are directed away from the sound sources 1203 according to their directional indicators $1305_2$ and $1305_3$. In such embodiments the downmix selector can be configured to select only the first $1301_1$ and the fourth $1301_4$ audio source or devices for downmixing.

Although the description herein has been described with respect to the downmix selector 307 performing a 'in focus' selection criteria other selective criteria could be selected such as 'out of focus' selective criteria or degree of focus selection.

Thus in at least one of the embodiments there can be an apparatus comprising an audio analyser configured to determine for a set of received audio signals at least one dominant audio signal source; and a selector configured to select from the set of audio signals at least one audio signal dependent on the at least one dominant audio signal source.

Although the above has been described with regards to audio signals, or audio-visual signals it would be appreciated that embodiments may also be applied to audio-video signals where the audio signal components of the recorded data are processed in terms of the determining of the base signal and the determination of the time alignment factors for the remaining signals and the video signal components may be synchronised using the above embodiments of the invention. In other words the video parts may be synchronised using the audio synchronisation information.

It shall be appreciated that the term user equipment is intended to cover any suitable type of wireless user equipment, such as mobile telephones, portable data processing devices or portable web browsers.

Furthermore elements of a public land mobile network (PLMN) may also comprise apparatus as described above.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

The invention claimed is:

1. Apparatus comprising at least one processor and at least one memory including computer code, the at least one memory and the computer code configured to with the at least one processor cause the apparatus to at least:
   determine for a set of received audio signals at least one dominant audio signal source by the apparatus being caused to;
   determine for at least one of the set of received audio signals at least one audio event, determine at least one dominant audio event by the apparatus being further caused determine at least one dominant audio event associated audio signal direction for a first time being the average of at least one audio event associated audio signal direction and determine the at least one dominant audio event associated audio signal direction for further times by selecting the audio event with an associated audio signal direction closest to a preceding dominant audio event associated audio signal direction, and
   determine at least one dominant audio signal source dependent on the dominant audio event determined; and
   select from the set of audio signals at least one audio signal dependent on the at least one dominant audio signal source.

2. The apparatus as claimed in claim 1, wherein the apparatus is caused to determine for at least one of the set of received audio signals at least one audio event is further caused to:
   determine for each of the received audio signals an associated audio signal direction;
   determine a stable audio signal direction from the associated audio signal direction;
   associate at least one audio event with a time interval for the stable audio direction.

3. The apparatus as claimed in claim 2, wherein the apparatus caused to associate at least one audio event with the timings associated with the stable audio signal direction is further caused to:
   determine whether the time interval for the stable audio signal direction intersects with a time interval associated with any determined audio event.

4. The apparatus as claimed in claim 3, wherein the apparatus caused to determine whether the time interval for the stable audio signal direction intersects with a time interval associated with any determined audio event is further caused to generate a further audio event, the further audio event being associated with the time interval for the stable audio signal direction dependent on determining the time interval for the stable audio signal direction is disjoint with every audio event associated time interval.

5. The apparatus as claimed in claim 3, wherein the apparatus caused to determine whether the time interval for the stable audio signal direction intersects with a time interval associated with any determined audio event is further caused to associate an intersection of the time interval associated with a audio event and the time interval for the stable audio signal direction where the time interval associated with the audio event intersects with the time interval for the stable audio signal direction.

6. The apparatus as claimed in claim 2, wherein the apparatus caused to determine a stable audio signal direction is further caused to:
   determine a first direction value of the associated audio signal direction at a first time;
   determine a second direction value of the associated audio signal direction at a second time; and
   determine the difference between the first direction value and the second direction value is less than or equal to a determined difference threshold.

7. The apparatus as claimed in claim 1, wherein the apparatus caused to determine at least one dominant audio signal source is further caused to define a position of the at least one dominant audio signal source dependent on the dominant audio event determined.

8. The apparatus as claimed in claim 7, wherein the apparatus caused to select from the set of audio signals at least one audio signal dependent on the at least one dominant audio signal source is further caused to select from the set of audio signals at least one audio signal dependent on an associated direction of the at least one audio signal and the position of the at least one dominant audio signal source.

9. A method comprising:
   determining for a set of received audio signals at least one dominant audio signal source by;
   determining for at least one of the set of received audio signals at least one audio event, determining at least one dominant audio event by determining at least one dominant audio event associated audio signal direction for a first time being the average of at least one audio event associated audio signal direction and determining the at least one dominant audio event associated audio signal direction for further times by selecting the audio event with an associated audio signal direction closest to a preceding dominant audio event associated audio signal direction, and
   determining at least one dominant audio signal source dependent on the dominant audio event determined; and
   selecting from the set of audio signals at least one audio signal dependent on the at least one dominant audio signal source.

10. The method as claimed in claim 9, wherein determining for at least one of the set of received audio signals at least one audio event comprises:
    determining for each of the received audio signals an associated audio signal direction;
    determining a stable audio signal direction from the associated audio signal direction; and
    associating at least one audio event with a time interval for the stable audio direction.

11. The method as claimed in claim 10, wherein associating at least one audio event with the timings associated with the stable audio signal direction comprises determining whether the time interval for the stable audio signal direction intersects with a time interval associated with any determined audio event.

12. The method as claimed in claim 11, wherein determining whether the time interval for the stable audio signal direction intersects with a time interval associated with any determined audio event comprises generating a further audio event, the further audio event being associated with the time interval for the stable audio signal direction dependent on determining the time interval for the stable audio signal direction is disjoint with every audio event associated time interval.

13. The method as claimed in claim 11, wherein determining whether the time interval for the stable audio signal direction intersects with a time interval associated with any determined audio event comprises associating an intersection of the time interval associated with an audio event and the time interval for the stable audio signal direction where the time interval associated with the audio event intersects with the time interval for the stable audio signal direction.

14. The method as claimed in claim 10, wherein determining a stable audio signal direction comprises:
   determining a first direction value of the associated audio signal direction at a first time;
   determining a second direction value of the associated audio signal direction at a second time; and
   determining the difference between the first direction value and the second direction value is less than or equal to a determined difference threshold.

15. The method as claimed in claim 9, wherein determining at least one dominant audio signal source comprises defining a position of the at least one dominant audio signal source dependent on the dominant audio event determined.

16. The method as claimed in claim 15, wherein selecting from the set of audio signals at least one audio signal dependent on the at least one dominant audio signal source comprises selecting from the set of audio signals at least one audio signal dependent on an associated direction of the at least one audio signal and the position of the at least one dominant audio signal source.

* * * * *